(12) United States Patent
Lægdsgaard

(10) Patent No.: US 9,578,989 B2
(45) Date of Patent: Feb. 28, 2017

(54) GRINDING UNIT, A CARTRIDGE FOR THE GRINDING UNIT AND USE OF SAME FOR GRINDING COFFEE BEANS

(71) Applicant: IDEAS DENMARK A/S, Hvidovre (DK)

(72) Inventor: Kristian Lægdsgaard, Copenhagen (DK)

(73) Assignee: Ideas Denmark A/S, Hvidovre (DK)

( * ) Notice: Subject to any disclaimer, the term of this patent is extended or adjusted under 35 U.S.C. 154(b) by 0 days.

(21) Appl. No.: 14/767,572

(22) PCT Filed: Feb. 13, 2014

(86) PCT No.: PCT/EP2014/052788
§ 371 (c)(1),
(2) Date: Aug. 12, 2015

(87) PCT Pub. No.: WO2014/125006
PCT Pub. Date: Aug. 21, 2014

(65) Prior Publication Data
US 2016/0015214 A1    Jan. 21, 2016

(30) Foreign Application Priority Data
Feb. 14, 2013    (EP) .................................. 13155230

(51) Int. Cl.
*A47J 42/00*    (2006.01)
*A47J 42/10*    (2006.01)
(Continued)

(52) U.S. Cl.
CPC ............... *A47J 42/10* (2013.01); *A47J 42/08* (2013.01); *A47J 47/02* (2013.01)

(58) Field of Classification Search
CPC ............. A47J 42/08; A47J 42/10; A47J 42/04
(Continued)

(56) References Cited

U.S. PATENT DOCUMENTS 4,771,954 A * 9/1988 Poncy ..................... A47J 42/04
                                                           241/169.1
5,052,631 A * 10/1991 Poncy ..................... A47J 42/04
                                                           241/169.1
(Continued)

FOREIGN PATENT DOCUMENTS

DE        19 60 314 A1     6/1971
DE        295 06 788 U1    9/1995
(Continued)

OTHER PUBLICATIONS

International Search Report and Written Opinion, PCT/EP2014/052788, mailed Jun. 13, 2014.
(Continued)

*Primary Examiner* — Faye Francis
(74) *Attorney, Agent, or Firm* — Winston & Strawn LLP

(57) ABSTRACT

A grinding unit having a ring burr and a frustoconical burr that together delimit a grinding gap therebetween. A first angle between a first subset of curved teeth of the frustoconical burr and the first curved teeth of the ring burr provides a grinding gap having an angle smaller than a second angle between a second subset of curved teeth of the frustoconical burr and the first curved teeth of the ring burr. A geometrical outline taken through the cusps of the second curved teeth at the top end face of the frustoconical burr opposite the base is a square or rectangle. This grinding unit produces a ground product, such as ground coffee beans, with fewer turns than known grinding units and with less effort. The properties and qualities of the resulting ground products are superior to those obtained with conventional grinding units because flavor and aroma are retained.

21 Claims, 13 Drawing Sheets

(51) Int. Cl.
  *A47J 42/08*   (2006.01)
  *A47J 47/02*   (2006.01)

(58) Field of Classification Search
  USPC .................................... 241/168, 169.1, 293
  See application file for complete search history.

(56) References Cited

U.S. PATENT DOCUMENTS

| 6,224,005 | B1 | 5/2001 | Wu | |
|---|---|---|---|---|
| 7,273,005 | B2 | 9/2007 | Turi | |
| 7,604,192 | B2 * | 10/2009 | Tang | A47J 36/02 |
| | | | | 241/169.1 |
| 8,382,017 | B2 * | 2/2013 | Bich | A47J 42/02 |
| | | | | 241/169.1 |
| 2016/0045070 | A1 * | 2/2016 | Sahli | A47J 31/42 |
| | | | | 241/257.1 |
| 2016/0045071 | A1 * | 2/2016 | Sahli | A47J 31/42 |
| | | | | 241/261.2 |

FOREIGN PATENT DOCUMENTS

| DE | 195 14 794 A1 | 10/1996 | |
|---|---|---|---|
| EP | 1 818 099 A1 | 8/2007 | |
| EP | 1 818 100 A1 | 8/2007 | |
| EP | 2 050 377 A1 | 4/2009 | |
| FR | 1472524 A * | 3/1967 | ............. A47J 42/10 |
| WO | 2008/059545 A1 | 5/2008 | |

OTHER PUBLICATIONS

Preciso Conical Burr Coffee Grinder, Operations Manual, www.bartaza.com, pp. 1-13 (2010).
Virtuoso Conical Burr Coffee Grinder, Operations Manual, www.bartaza.com, pp. 1-12 (2012).
Encore Conical Burr Coffee Grinder, Operations Manual, www.bartaza.com, pp. 1-12 (2012).
OE Pharos Hand Coffee Grinder Design Project, 9 pgs. (2011). http://www.orphanespresso.com/oe-pharos-hand-coffee-grinder_ep_636-1.html.
Kyocera Hand Coffee Grinder, 2 pgs. (2010). http://www.orphanespresso.com/Kyocera-Hand-Coffee-Grinder_ep . . . .

* cited by examiner

GRINDING UNIT, A CARTRIDGE FOR THE GRINDING UNIT AND USE OF SAME FOR GRINDING COFFEE BEANS

This application is a 371 filing of International Patent Application PCT/EP2014/052788 filed Feb. 13, 2014, which claims priority to European patent application no. 13155230.9 filed Feb. 14, 2013.

BACKGROUND

The present invention relates to a grinding unit comprising at least
- a stationary ring burr with an opening for receiving a rotary frustoconical burr to delimit a grinding gap there between, which grinding gap has an outlet for grinded matter at a base of the frustoconical burr and an inlet for matter to be grinded at the opposite top end face of the frustoconical burr,
- the ring burr has an interior wall provided with annularly spaced apart first curved teeth protruding radially into the grinding gap, and
- the frustoconical burr has an annular exterior wall provided with annularly spaced apart second curved teeth protruding into the grinding gap.

Grinders for grinding various kinds of solid matter, such as coffee and spices are commonly known, and depending on the nature of the granular matter to be downsized by grinding and the end purpose of the grinded matter, the grind size is particular relevant. For example coffee drinkers require different grinds for different purposes and grinds size and grinding operation influences preservation of flavour and aroma of the grinded granular matter. Coffee drinkers may for example require coarsely ground coffee beans for press pots, and more finely ground coffee beans for drip filter machines and espresso, and even finer ground coffee for Turkish coffee. How coarse or fine grind or milling size, which is desired, often comes down to individual taste. It should be noted that most coffee grinders cannot produce the very fine grinding grade needed for Turkish coffee.

There is a demand for alternative devices for grinding granular or particulate matter or re-grinding particulate matter further or a second time in a manner that sets free any content of aromatic compounds, e.g. so that such aromatic compounds can be extracted, as is the case when brewing coffee.

European patent application EP 1818099A1 and EP 1818100A1 both disclose grinding devices including a frustoconical burr mill arranged for grinding particulate and granular matter such as corn or particles of e.g. pepper, corn, salt, sugar and coffee. These known grinding devices comprise a milling cone, the cone burr, and a surrounding milling ring, the ring burr, such that a grinding gap is formed between the cone and the ring. The cone and surrounding ring may e.g. be manufactured in metal or ceramics. The cone comprises five teeth running along the outer surface of the cone, from the top to the bottom of the cone. These teeth on the cone serve to move and transport the corn or particles. The ring on the other hand is presented as having several grooves running along it's inner surface, from the top to the bottom of the ring.

German patent application DE19514794A1 discloses a similarly structured grinding unit also having a frustoconical burr, a truncated cone, enclosed in a fixed burr ring leaving a grinding gap between them. The burr ring and frustoconical burr each have six opposite teeth and grinding grooves facing against each other. The teeth slope at acute angles to the vertical direction of travel and the teeth decrease in height towards the maximum cone diameter.

The inventor of the present invention has realised that if solid food granules and/or particles having sizes of e.g. between 2-10 mm are grinded the grinding path from inlet to outlet is too short to provide a resulting grinded product complying with food enthusiasts demand for high quality properties, e.g. properties relating to extracting aromatic compounds, and to dispersion properties. The grinding operation of known grinders requires many turns and thus long time, moreover inlet gap of known grinding units is rather large so that many turns are required to operate the grinding unit for goods grinding results. Raw matter and grinded matter often have very inhomogeneous particle sizes, and manual grinding requires extra effort.

A further major disadvantage of known frustoconical burr mills is that they cannot re-grind for example coffee. Ground coffee cannot be made finer because the burrs rapidly clog. Only whole beans or very course granules can be grinded and manufacturers of coffee grinders with ring burr and cone burr instruct and warn users accordingly in accompanying instruction manuals. Even if instruction manuals are followed maintenance must be made frequently to prevent clogging.

The increasing demand for effective, fast grinding of e.g. coffee beans, without loosing taste and aroma, put focus on grinding devices and requires improvement of such known devices.

SUMMARY OF THE INVENTION

It is an aspect of the present invention to provide a grinding unit of the kind mentioned in the opening paragraph that provides a gentle, but still effective, grinding of particulate or granular matter, in particular grinding coffee beans.

In another aspect is provided a grinding unit of the kind mentioned in the opening paragraph that is more efficient than known grinding units.

In yet another aspect is provided a grinding unit of the kind mentioned in the opening paragraph the use of which results in substantially uniform particle size of grinded matter.

In another aspect is provided a grinding unit of the kind mentioned in the opening paragraph grinding faster than known grinding units.

In yet another aspect is provided a grinding unit of the kind mentioned in the opening paragraph that can grind already grinded matter.

In yet another aspect is provided a grinding unit of the kind mentioned in the opening paragraph that produces a resulting grinded product with fewer turns than known grinding units.

In yet another aspect is provided a grinding unit of the kind mentioned in the opening paragraph with improved entrance of particles and granules into the grinding gap and improved downwards movement of more or less grinded matter during grinding.

In yet another aspect is provided a grinding unit of the kind mentioned in the opening paragraph that can be used with different grinders.

In yet another aspect is provided a cartridge for the grinding unit according to the invention.

In yet another aspect is provided a grinding unit and a cartridge where both are replaceable parts.

The novel and unique whereby these and other aspects are achieved according to the present invention consist in that the second curved teeth comprise a first subset of curved teeth and a second subset of curved teeth configured so that at least a part of the curved teeth of the first subset protrude longer into the grinding gap than the second subset of curved teeth, and so that the first subset of curved teeth and the second subset of curved teeth define axially extending grinding grooves tapering towards a base of the frustoconical burr, and a geometrical outline taken through the cusps of the second curved teeth at the top end face of the frustoconical burr opposite the base is substantially a square or a rectangle.

Within the context of the present invention the term "burr", is used for a component of a milling or grinding device to grind e.g. hard, small food products, in particular coffee beans. A "burr" has an abrasive surface or similar structured surface suited to comminute hard particulate matter caught in the gap to an opposite abrasive surfaces. A "burr mill" means a mill using burrs for comminuting, grinding, milling and/or crushing. Usually a burr mill includes a rotating screw, e.g. a "frustoconical burr", that pushes the solid particles or granules to be grinded through the mill while solid particles or granules are made into smaller particles due to the interaction of opposite abrasive surfaces of a surrounding "ring burr". Emphasis is made that "burr mills" differ from blade grinders in producing less frictional heat and therefore often are the preferred grinding unit for grinding foodstuffs.

The terms "particles", "particle", "granule", "granules" and "granular" used in context of solid matter supplied to the grinding unit includes, but are not limited to, solid particles being seeds of various plants, in particular coffee beans. Particles in form of seeds of spices such as peppercorn, clove, mustard, aniseed, star anise; crystallised spices in form of grains or flakes of salt; and even spices in form of bark, such as sticks of cinnamon, are also contemplated as raw materials suited for grinding using the present invention, and are within the above terms. The size and shape of a "particle" or a "granule" to be grinded may e.g. be that of a coffee bean or a peppercorn. A "solid" particle or granule may also be hollow or porous.

The term "frustoconical" is used to identify a body shaped in general as the frustum of a cone, thus the frustum is the basal part of the cone left after cutting off the top of the cone by a plane parallel to the base surface of the cone. Accordingly, a "frustoconical burr" is a burr generally shaped as the frustum of a cone and having an abrasive exterior surface.

The term "circumscribed curve" is to be understood as a closed curve drawn through the vertices of a figure, e.g. the annular figure defined by the teeth in a set of teeth projecting into the grinding gap at the top face of the frustoconical burr. Correspondingly an "inscribed curve" is to be understood as a closed curve drawn through the vertices of a figure, e.g. the annular figure defined by the teeth in a set of teeth projecting into the grinding gap at the top face of the ring burr. When used in context with the term "circle" the term "circle" should not be understood as limited to a geometrically perfect circle. The term "circle" also includes geometrical figures with e.g. an oval shape and approximated circles.

Within the context of the present invention the term "square" should be understood as the geometrical shape of a quadrilateral wherein all sides are equal, and the interior angles are right angles, thus opposite sides are parallel. The term "square" should not be construed narrowly to be understood as explicitly limited to a geometrically perfect square. Geometrical square-like shapes that give the viewer the overall impression and perception of a square are also contemplated by the term "square".

The term "rectangle" should be understood in a similar manner, as the geometrical shape of a quadrilateral. The rectangle differs from the square by having a set of long sides and a set of short sides. Opposite sides are still generally parallel and the interior angles are generally right angles. The term "rectangle" should however not be construed narrowly as explicitly limited to a geometrically perfect rectangle. Geometrical rectangle-like shapes that give the viewer the overall impression and perception of a rectangle are also contemplated by the term "rectangle".

Thus two opposite sides of a "square" or of a "rectangle" may be more or less convex and concave, thus e.g. be bending away from each other, but not to an extent that the "square" or "rectangle" gives the viewer an impression of a circular figure.

The axially extending grinding grooves tapering towards the base of the frustoconical burr are configured so that the first subset of curved teeth protrude longer into the grinding gap than the second subset of curved teeth to thereby provide a grinding gap that enables highly efficient grinding of solid particles and granules. The radial distance from the cusps of the first subset of teeth to the ring burr and the radial distance from the cusps of the second subset of teeth to the ring burr are different thereby promoting easy rotational transport of particles and granules about the axes of the ring burr and frustoconical burr, and at the same time minimising the risk of clogging and obstruction of rotational movement of ring burr in relation to frustoconical burr.

The time consumption for grinding, when compared to already existing grinding devices, is small and the grinding operation is very gentle to the feedstock particles and granules, resulting in a superior grinding quality preserving delicate chemical and physical properties of foodstuffs. In case of e.g. coffee beans, the best possible taste and aroma can be extracted from the grinded particles and granules when the coffee beans have been grinded in the grinding gap of the grinding unit of the present invention, because grinding is very fast. Also, variations in the particle size of the product after the grinding operation, in particular when regrinding, are substantially smaller than with many known grinding devices, and the grinded product appears as a very homogenous composition. In case of e.g. pepper corn or cinnamon the ground or powdered product is thus easier to disperse in another substance. Thus aromatic delight of the product resulting from the grinding is highly improved due to the gentle grinding and the high quality resulting from the fast and gentle grinding process.

This is especially important for coffee aficionados looking to get the most flavor from the freshly ground beans. Coffee contains about 700-800 different aromatic compounds, which makes coffee one of the most aromatic food products. About 50% of these aromatic compounds are so volatile that they are vaporised within 30 minutes after end of grinding. Use of the grinding unit according to the present invention minimize loss of these aromatic compounds and of the natural flavor of food products, in particular of coffee, compared to conventional grinders, by grinding so fast and efficient that extraction of the aromatic compounds can start while content of aromatic compounds are still at the highest.

The geometrical outline taken through the cusps or vertices of the second curved teeth at the top end face of the frustoconical burr opposite the base is substantially square or rectangular, so that the particles or granules are hit with different radial forces during rotating the frustoconical burr in the ring burr about their respective longitudinal axes taken through their centres.

The sides of the geometrical outline of the square or rectangular top of the frustoconical burr may have straight or curved opposite sides.

The distance between the cusps or vertices of two opposite tooth of the first subset of curved teeth may be larger than the distance between the cusps or vertices of two opposite tooth of the second subset of curved teeth.

The cusps or vertices of the first subset of teeth are located in the corners of the square or rectangle so that the cusps or vertices of the second subset of teeth can extend radially into the grinding gap, optionally the opposite sides of the perceived square or rectangle may bend slightly away from each other to also pass through the cusps or vertices of the second subset of curved teeth, but not to an extent that compromises the overall quadrilateral impression of the top end face of the frustoconical burr.

The number of teeth of the second curved teeth, at least at a top end face of the frustoconical burr, may be even, preferably the number is at least six, more preferred the number is eight. The number of teeth may be selected so that radial distance between teeth is substantially the same as the width or radius of a particle or a granule. The different radii of first subset of curved teeth and second curved teeth provide for an interval of particles sizes. Large particle and granule may only be able to pass into the grinding gap in a position wherein the opposite first curved teeth and the second subset of second curved teeth are in front of each other. Such large particles are then held inside the grinding gap and move towards the base when the frustoconical burr is rotated so that the first curved teeth is in front of the first subset of second curved teeth. The number of teeth should or could also be selected in view of height of grinding unit taken together with the kind of matter to be grinded. So a high grinding unit may have more teeth than a low grinding unit.

The more teeth of the second curved teeth, the larger area of the free top end face of the frustoconical burr. Thus the number of teeth must be chosen in view of not having negative impact on and reduce level of access and passage of the particles and/or granula into the grinding gap via the grinding gap inlet. The inventor of the present invention has found out that eight teeth are very effective in the design of the grinding unit according to the present invention. Although five, six or seven teeth or even four teeth would be possible, the grinding properties obtained due to the steep grinding gap of a grinding unit with eight teeth are superior. By means of the grinding unit according to the present invention, grinding requires fewer turns than when using known grinding units, in particular when using a manually operated grinding unit. A further advantage is that particles and granules are better drawn inside the grinding gap and downward than in many prior art grinding units, so as to be kept in the grinding gap for grinding. The problems seen for some conventional grinding unit that particles jump upwards and out of the grinding gap during grinding is minimal or is even eliminated.

According to the present invention
- a first line extends via a first upper point on a first circumscribed curve of the teeth of the first subset of curved teeth at a free top end face of the frustoconical burr through a first lower point on a second first circumscribed curve at tapered ends of the grinding grooves, and intersects a longitudinal axis of the frustoconical burr,
- a second line extends via a second upper point on a second circumscribed curve of the teeth of the second subset of curved teeth at the free top end face of the frustoconical burr through a second lower point on the second first circumscribed curve at tapered ends of the grinding grooves, and intersects a longitudinal axis of the frustoconical burr,
- a third line extends between a third point on an upper inscribed curve of the first curved teeth of the ring burr at the grinding gap inlet through a third lower point on a lower inscribed curve of the first curved teeth of the ring burr at the entry of the grinding gap outlet, and intersects or is parallel to the longitudinal axis of the ring burr, wherein
- a first angle between the first line and the third line is smaller than or equal to a second angle between the second line and the third line.

Due to the selection of the first angle and the second angle the teeth of one of the subsets of teeth may protrude more into the grinding gap than the teeth of the other subset of teeth. This expedient way a particle or a granule can be both milled, grinded and/or crushed in same rotation, applying minimum frictional force upon the particles or granules at any position inside the grinding gap, irrespective of this position being vertical or radial, so that flavour and taste components are treated outmost gentle.

A tooth of the first subset of teeth may be arranged alternate with a tooth of the second subset of teeth, thus one after the other, to define the first circumscribed curve and the second circumscribed curve, respectively.

In an expedient embodiment of the grinding unit according to the present invention
- the first angle between the first line and the third line is smaller than or equal to 20°, and
- the second angle between the second line and the third line is smaller than or equal to 25°, thereby obtaining steeper grinding gaps than with prior art grinding unit having grinding parts being a ring burr and a frustoconical burr.

The grinding gap can for some embodiments be steeper than obtained by the above mentioned selected first angle and second angle.

As such examples the first angle $\phi$ can be smaller than or equal to 19°, alternatively be smaller than or equal to 18°, alternatively be smaller than or equal to 17°, alternatively be smaller than or equal to 16°, alternatively be smaller than or equal to 15, alternatively be smaller than or equal to 14, alternatively be smaller than or equal to 13, alternatively be smaller than or equal to 12, alternatively be smaller than or equal to 11; and/or the second angle $\theta$ can be smaller than or equal to 25°, alternatively be smaller than or equal to 24, alternatively be smaller than or equal to 23°, alternatively be smaller than or equal to 22°, alternatively be smaller than or equal to 21°, alternatively be smaller than or equal to 20°, alternatively be smaller than or equal to 19.

The optimum angles are chosen in dependency of the kind of granules and particles to be grinded, in particular the size and shape of said particles.

In one embodiment the grinding unit can e.g. have a first angle smaller than or equal to 17° and a second angle smaller than or equal to 22° to provide the required steepness for grinding some kind of coffee beans, whereas another selection of angles works better for other coffee beans.

Both the first subset of curved teeth and the second subset of curved teeth take part in both milling and crushing. The cusps of the first subset of teeth may preferably be blunt and thus particularly suited for milling, and the cusps of the second subset of teeth may preferably be pointed, thus particularly suited for cutting and crushing. Thus the grinding unit according to the present invention take advantage of a combined functionality in one and same grinding unit, and at the same time continuous operation can be ensured.

The first angle and the second angle of a prior art grinding unit are normally much higher than in the grinding unit of the present invention, at least 20° and 27°, respectively. Also, such grinding units are so low that the width of the inlet of the grinding gap becomes so large that some of the particles or granules feed to the grinding unit are repelled instead of kept inside the grinding gap to be drawn down into this grinding gap for abrasive processing. These disadvantages are remedied to a large extent by means of the steeper grinding gap and by the provision of first subset of curved teeth and the second subset of curved teeth in accordance with the present invention. A significantly higher vertical force component is obtained for drawing fed particles and granules downwards into the tapering grinding gap and out of the grinding gap outlet by reducing the first and second angles.

In the novel grinding unit fewer rotations of the frustoconical burr inside the ring burr, or vice versa, than with known devices, are required, because particles and granules are drawn more efficiently down between the teeth of the opposite burrs during comminuting, grinding and/or milling to obtain the desired resulting down-sized product. Moreover, the tendency to clog is substantially reduced, due to the higher vertical force and/or less frictional heat applied to the grinded particles.

In some grinding units the first angle can be even smaller, e.g. smaller than or equal to 13°, preferably smaller than or equal to 11°, and more preferred smaller than or equal to 9, and the second angle can be smaller than or equal to 22°, and more preferred smaller than or equal to 20°, even more preferred smaller than or equal to 18°, and even more preferred smaller than or equal to 16°. The optimum first angle and second angle can preferably be selected so that the inlet gap corresponds to the size and shape of the granules or particles of the feedstock matter to be grinded. This way all particles and granules of a feedstock charge or batch become grinded, and no particles or granules are repelled or thrown away from the grinding gap.

A further way of ensuring that granules and particles enter appropriately into the grinding gap is keeping a very steep first angle and second angle and increasing the heights of the co-operating ring burr and the frustoconical burr so that the grinding gap inlet is just as wide as required for a granule or a bean or other particle to pass into the grinding gap for being grinded. So the ring burr and the frustoconical burr may have heights selected to provide a grinding gap inlet with a width sized in accordance with the size and shape of particles or granules to be grinded. It is also possible to utilize a combination of adjusting angles and heights to arrive to the optimum grinding solution for a specific task and product to be grinded. In very high grinding units number of teeth may preferably be larger than for low grinding units.

The height of the frustoconical burr may e.g. be at least 65% of the diameter of the base of the frustoconical burr, preferably at least 67%, and more preferred at least 69% of the diameter of the base of the frustoconical burr. Given the steep grinding gap of the grinding unit according to the invention the top end face of the frustoconical burr at the inlet of the grinding gap may in some embodiment have a much larger area than in the prior art grinding devices without compromising entry of the particles or granules into the grinding gap.

Although the grinding unit can be made of many different kinds of materials being resistant to frictional wear, including metal and certain plastic materials, ceramic materials may be preferable. Accordingly, for most grinding purposes at least one of the ring burr and the frustoconical burr are made of at least one ceramic material, preferably both the ring burr and the frustoconical burr are made of at least one ceramic material. Ring burr and frustoconical burr may be made of same or different ceramics, and each also be made of one or more ceramics. Ceramics are extremely hard and non-corrosive, and provide the best performance for multi-use grinding.

The ring burr and/or the frustoconical burr is/are axially displaceable along it's/their longitudinal axis in order to be able to adjust grinding degree, and thus the size of a resulting particle or granule after grinding the feedstock. The technique of axially adjusting the grinding unit including burr mills is known within the art. The non-rotating ring burr of the grinding unit is e.g. positionable relative to the rotating frustoconical burr, or vice versa, so as to enable a selectable adjustment of the volume or closeness of the grinding gap and thus available grinding space.

The curvature of the first curved teeth may be a clockwise first threading and the curvature of the second curved teeth be a counter-clockwise second threading, or vice versa. By "threading" is meant a plurality, preferably eight, more or less pointed, flat-faced or blunt protrusions twisting about the longitudinal axes of the ring burr and the frustoconical burr, respectively. A flat-faced or blunt protrusion may have sharp opposite threading edges. A "tooth" is configured to protrude radially from a respective surface and run along a smooth curve from a starting point at the top end face to an end point close to the base of the ring burr and the frustoconical burr, respectively, where starting point and end point are radially offset. A tooth is thus a radially protruding rib twisting about the frustum of the cone burr or twisting along the interior wall of the ring burr. A guideway for downwards movement of the particles or granules is created between adjacent and opposite teeth.

The teeth of the second curved teeth may advantageously divide into a multiplicity of finer curved third teeth towards the base of the frustoconical burr, and/or the first curved teeth may advantageously divide into a multiplicity of finer curved fourth teeth towards the base of the ring burr to enable fine grinding at the grinding gap outlet. The blunt front face of first subset of curved teeth of the second curved teeth may advantageously become wider and wider towards the base of the frustoconical burr before the second curved teeth divide into the third curved teeth thereby improving milling properties.

The invention also relates to a cartridge including the grinding unit defined above. The cartridge serves to accommodate the grinding unit, preferably in a detachable manner, with the object of being able to use the grinding unit in grinders of various designs.

The cartridge comprises a cartridge housing and a grinding gap adjusting means, which grinding gap adjusting means is rotatable about it's longitudinal centre axis and serves for keeping the grinding gap of the grinding unit in operative grinding position inside the cartridge housing. The cartridge housing comprises a bottom housing with a bottom opening for inserting the grinding unit. The bottom housing has a circumferential inner shoulder via which the bottom housing extends into an upper part configured for supplying matter to be grinded to the grinding unit. The bottom housing has retainer means for retaining the ring burr inside the bottom housing and to prevent rotation of the ring burr in relation to the bottom housing during grinding. The retainer means is in one embodiment provided by the shoulder of the bottom housing having at least one first locking protrusion for engaging at least one complementary notch or groove of the ring burr. In a second embodiment the retainer means is provided by the interior wall of the bottom housing having at least one complementary axially extending slot, notch or groove for engaging with at least one radially protruding female key of the ring burr. The engagement force of the parts of the retainer means may be increased by selecting proper dimensions and by friction.

Filling of the cartridge from above simplifies filling the cartridge with a charge of matter to be milled.

The grinding gap adjusting means may serve to secure the burrs position inside the cartridge as well as be utilized in adjusting closeness of grinding gap outlet. The grinding gap means may e.g. be selected from a locking ring or an adjusting wheel rotatable upon manipulation by hand.

Adjusting the size of the grinding gap outlet may take place by axial displacement of the ring burr, axial displacement of the frustoconical burr, or axial displacement of both in relation to each other.

In one embodiment of the cartridge according to the present invention the grinding unit rests on the locking ring in the upright position of the cartridge, so that e.g. the frustoconical burr can be moved axially by rotating said locking ring about it's central axis to adjust the size of outlet of the grinding gap. The shoulder defines the end position for upward axial displacement of the grinding unit, optionally by rotation of the locking ring, and contributes to define the largest possible grinding gap outlet and a dead position for the ring burr. The axial length of the at least one protrusion defines maximum axial travel of the ring burr without disengagement from the cartridge housing. The smallest possible grinding gap outlet is when the distance between the ring burr and the shoulder is largest.

The locking ring may have at least two axially protruding locking webs fitting slidably into corresponding internal guide grooves of the bottom housing, wherein an internal guide grove may have an axial guide groove part extending from the free opening of the bottom housing a distance towards the shoulder into a radially extending sloping guide groove part. In this way the locking ring does not easily disengage the cartridge housing, and the grinding unit does not accidentally drop out of the cartridge housing. The sloping of the sloping guide groove part serves as the means that controls distance of travel of the locking ring when it rotates, and thus the axial position of the grinding unit, in particular the mutual axial position of the frustoconical burr and the ring burr in relation to each other to adjust size of grinding gap outlet.

The sloping guide groove may in an alternative embodiment be stepped, wherein a step corresponds to a certain decided grind size. Adjusting the grind size can then be done simply by rotating the locking ring until the locking webs snap into a desired step. Snapping may even be associated with a noise or can be felt by the operator to ensure correct choice of grind size. Three different steps may e.g. correspond to fine, medium and course ground, but many more steps may be provided.

The grinding unit may be suspended in a spring-biased manner inside the cartridge.

It should be noted that when the size of the grinding gap outlet is adjusted by axial displacement of the ring burr relative to the frustoconical burr the grinding gap inlet may also be adjusted, and that height of burrs and first and second angles should be selected in view of this, as well as in view of the particle or granule to be grinded.

The upper part of the cartridge may include an anchor means for a grinding shaft, which is to be rotationally mounted in a grinder house, and operatively connected to the frustoconical burr by extending through the cartridge housing and the grinding unit which is inserted in the cartridge housing via the bottom housing to rotate the frustoconical burr for grinding, and coupling means for mounting the cartridge inside such grinder house with the grinding shaft accessible for performing the grinding operation.

The cartridge may further comprises at least a plug to be inserted into the bore of the frustoconical burr for receiving and engaging the grinding shaft extending axially through the plug.

The grinding unit according to the present invention, with or without the cartridge according to the present invention, is particularly suited for grinding coffee beans. When grinding coffee beans for espresso coffee a first angle of 17° and a second angle of 20° may as an example be appropriate.

BRIEF DESCRIPTION OF THE DRAWINGS

The invention will be described in further details below with references to the accompanying drawing, in which.

DETAILED DESCRIPTION OF THE INVENTION

In the following detailed description the grinding units and the cartridges according to the present invention are, just as non-limiting examples, described for grinding coffee beans in a coffee grinder. It should however be understood that the grinding unit is useful for grinding a lot of other particles and granules. The ring burr is substantially cylindrical, but could have other exterior outlines and need not be exactly circular. Heights and radii are exemplary and can be adjusted in relation to each other to reach the correct first angle and second angle for a given product to be grinded. Parts and features of different embodiments are not limited to the specific embodiment and part and features on one embodiment may be implemented in another embodiment.

Figure 1:
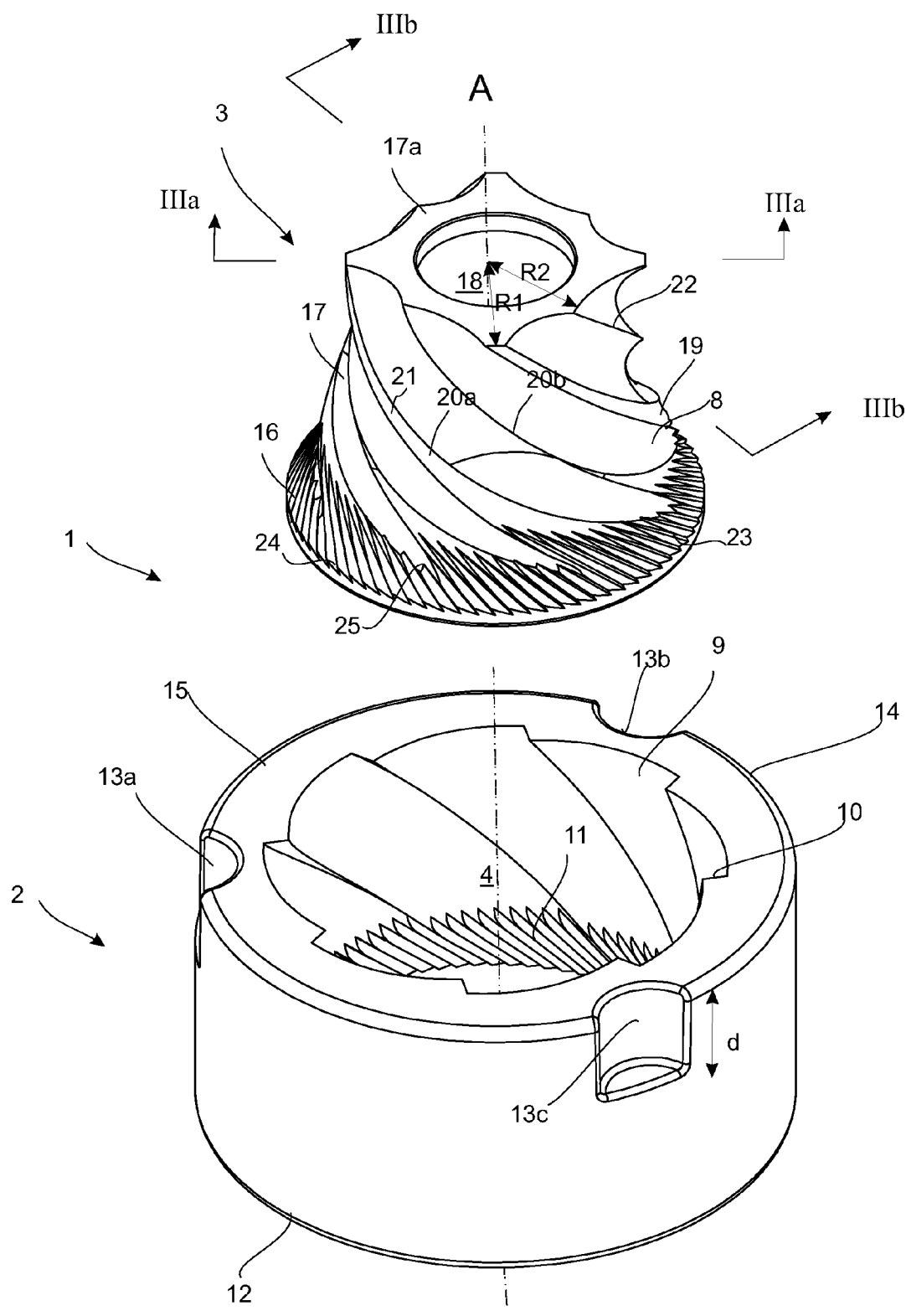
FIG. 1 is an exploded perspective view of an exemplary grinding unit according to the present invention seen oblique from above.

FIG. 1 shows, in an exploded perspective view, an embodiment of a grinding unit 1 comprising a ring burr 2 and a frustoconical burr 3 to be inserted via the opening 4 of the ring burr 2 from below. In FIG. 1 the ring burr 2 and the frustoconical burr 3 are arranged co-aligned along their respective longitudinal axes A;B, but it should be noted that in use in grinding the longitudinal axes A;B of these burrs 2;3 often become a bit offset or misaligned due to the presence of the coffee beans (not shown).

The ring burr 2 has an interior wall 9 provided with annularly spaced apart first curved teeth 10 protruding radially into opening 4. The first curved teeth 10 divide into a plurality of finer curved fourth teeth 11 at the base 12 of the ring burr 2, i.e. at the entry of the outlet of the grinding unit 1 in the assembled state of the burrs 2;3, to perform a final fine grinding of coffee beans before finally exiting the grinding unit 1. Three notches 13a,13b,13c are provided in the annular ring wall 14, which notches 13a,13b,13c extend from a top end 15 of the ring burr 2 from the exterior side of the annular ring wall 14 and a distance into the thickness of the annular ring wall 14, but not through the entire wall thickness, thus the notches 13a,13b,13c do not reach the first curved teeth 10. The axial length d of the notches 13a,13b,13c defines the maximum possible travel d of the ring burr 2 relative to the frustoconical burr 3 and thus the maximum interval for adjusting a grinding gap outlet between the ring burr 3 and the frustoconical burr 2.

Figure 2:
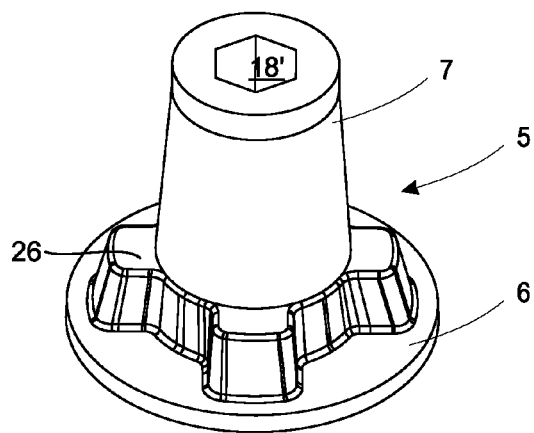
FIG. 2 is a perspective view of an exemplary plug for the grinding unit of FIG. 1 according to the present invention seen oblique from above.

The frustoconical burr 3 has a base 16, a substantially conical top part 17 with a top end face 17a, and a bore 18 extending axially through the frustoconical burr 3 and serving to receive a plug 5, e.g the plug 5 seen in FIG. 2, and a grinding shaft (not shown) for rotating the frustoconical burr 3 about it's longitudinal axis A and relative to the ring burr 2. The annular exterior wall 19 of the frustoconical burr 3 has annularly spaced apart second curved teeth 20a,20b protruding radially away from the longitudinal axis A and screwing about the longitudinal axis A as ribs or fins on the exterior face of the annular exterior cone wall 19.

The second curved teeth 20a,20b comprise a first subset of curved teeth 20a in alternate arrangement with a second subset of curved teeth 20b configured so that at least a part of the teeth of the first subset 20a protrudes closer to the burr ring 3 during grinding than the second subset of teeth 20b. Thus radius R1 of the teeth of the first subset of curved teeth 20a is larger than the radius R2 of the second subset of curved teeth 20b along the major part of the top part 17 seen from the top end face 17a. A further difference between the teeth of the first subset 20a and the teeth of the second subset 20b is that the cusps 21 of the teeth of the first subset 20a are blunter than the cusps 22 of the teeth of the second subset 20b, as seen better in the following figures FIGS. 4 and 9. For a blunt or wide tooth 20a crushing and grinding property prevails, and for a pointed or lees blunt tooth 20b cutting property prevail. Towards the base 16 the second curved teeth 20a,20b divide into a collar 23 of finer curved third teeth 24 for grinding interaction with the finer curved fourth teeth 11 at the base 12 of the ring burr 2. Grinding grooves 8 are defined between the teeth of the first subset of curved teeth 20a and the teeth of the second subset of curved teeth 20b, which grinding grooves 8 have ends 25 that taper towards the base 16.

FIG. 2 is a perspective view seen slightly oblique from the top of a plug 5 for insertion into the frustoconical burr 3 to lock a shaft from independent rotation, thus to bring the plug 5 and the frustoconical burr 3 along when rotated. The plug 5 has a foot 6 fitting into the base 16 of the frustoconical burr 3 and a neck 7 fitting into the bore 18 of the frustoconical burr. A bore 18' with a hexagonal cross-section extends through the plug 5 and serves for getting the good hold of a grinding shaft having a corresponding hexagonal cross-section (not shown). So in the present plug 5 the bore 18' has a hexagon cross-section but other cross-section may serve quite as well to ensure that a grinding shaft stays fixed to the frustoconical burr 3 during rotation and grinding. The foot 6 of the plug 5 has engagement means 26 for coupling with complementary engagement means 27 of the frustoconical burr 3 in order to establish an antirotation means for the grinding shaft (not shown) in relation to the frustoconical burr 3. Plug 5 and engagement means 26;27 can have any convenient design able of preventing the grinding shaft operated in a grinder from getting detached from the frustoconical burr 3, and the plug 5 and it's insertion into the bore 18 of said frustoconical burr 3 is not described any further.

Figures 3A, 3B:
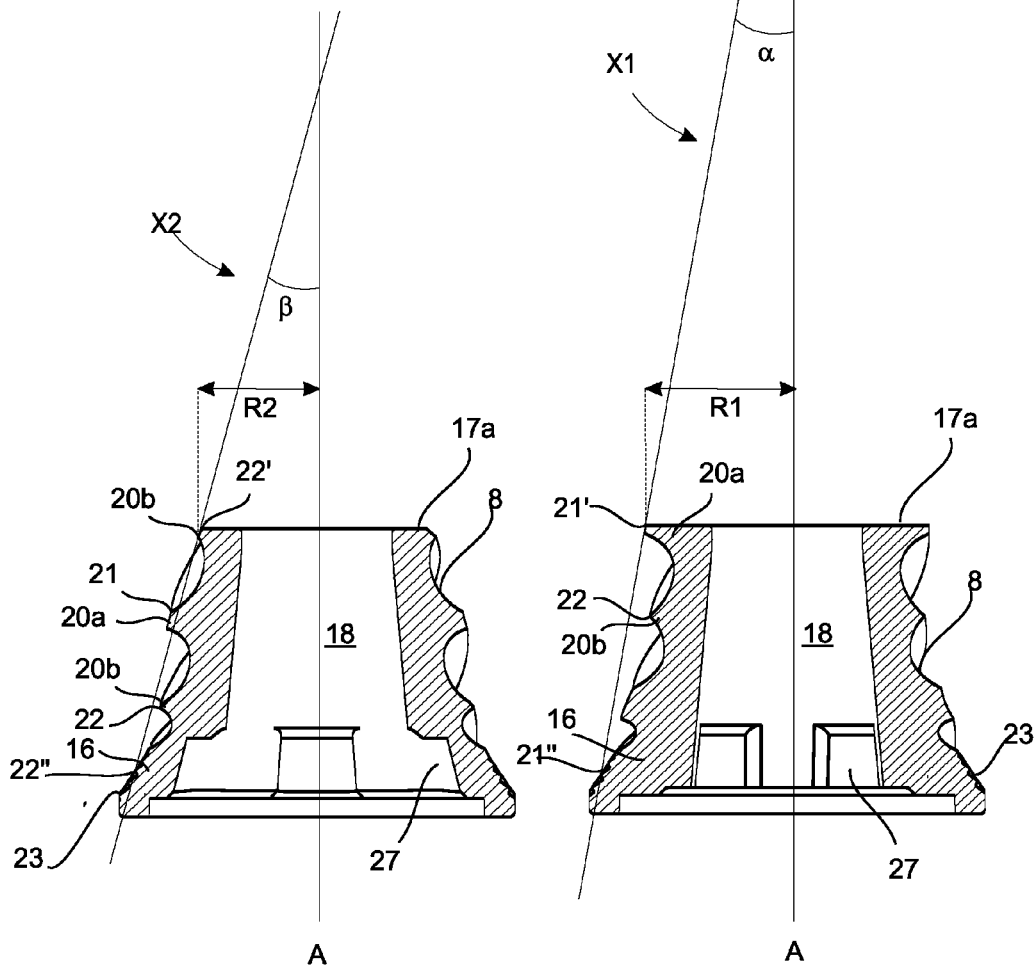
FIG. 3*a* is a longitudinal sectional view of the frustoconical burr taken along line IIIa-IIIa in FIG. 1, indicating the inclination of the first line.
FIG. 3*b* is a longitudinal sectional view of the frustoconical burr taken along line IIIb-IIIb in FIG. 1, indicating the inclination of the second line.
Figure 10:
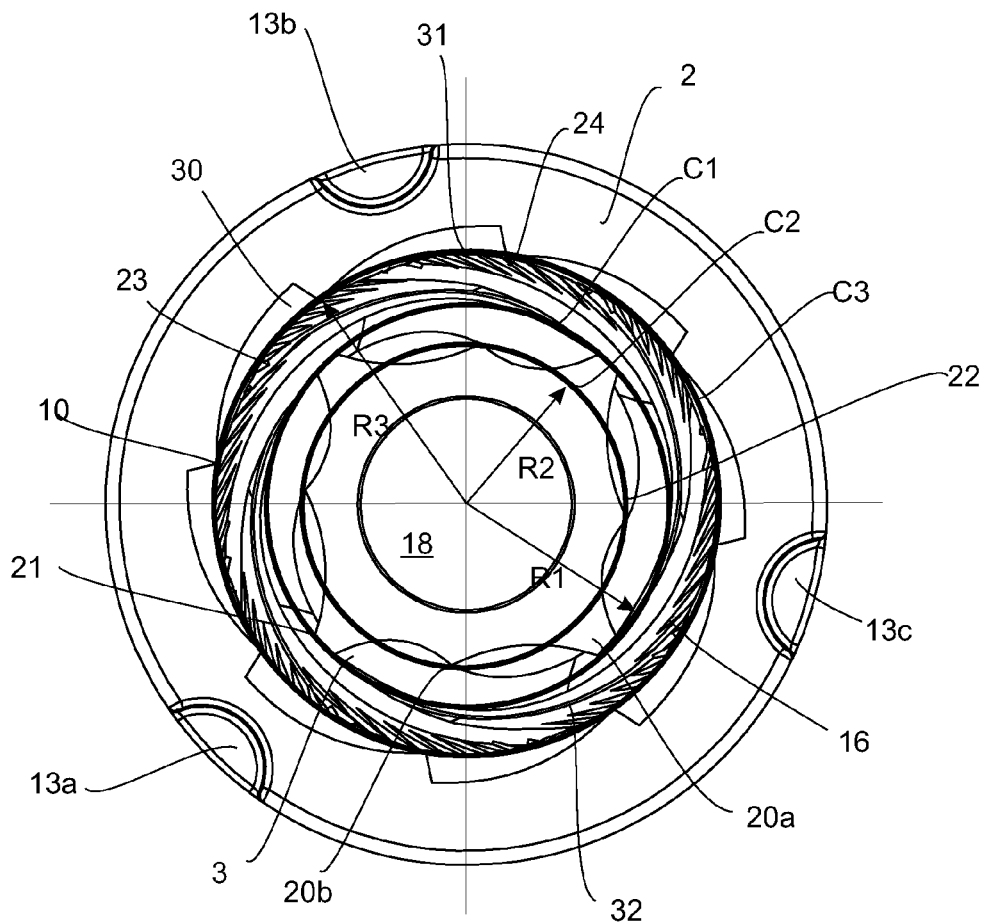
FIG. 10 shows the assembled grinding unit shown in FIG. 4 seen from the top end face of the frustoconical burr.

As illustrated in FIG. 3a a first line X1 extends via a first upper point 21', defined by the cusps 21 having the radius R1 of a first circumscribed curve of the teeth of the first subset 20a of curved teeth at the top end face 17a of the frustoconical burr 3, through a first lower point 21" on a second first circumscribed curve at the tapering ends 25 of the grinding grooves 8 of the frustoconical burr 3, and intersects a longitudinal axis A of the frustoconical burr 3 at an angle α. The circumscribed curves are illustrated in FIG. 10.

In the sectional view of FIG. 3b the longitudinal section IIIb-IIIB is taken in a similar manner as the longitudinal section IIIa-IIIa seen in FIG. 3a but with the cusps 22 of the teeth of the second subset 20b of curved teeth arranged in a plane similarly to the first subset 20a of curved teeth when taking the section seen in FIG. 3a. A second line X2 extends in similar manner via a second upper point 22', defined by the cusps 22, on a second circumscribed curve of the teeth of the second subset of curved teeth 20b at the top end face 17a of the frustoconical burr 3 through a second lower point 22" on the second first circumscribed curve at the tapering ends 25 of the grinding grooves 8 of the frustoconical burr 3, and intersects the longitudinal axis A of the frustoconical burr 3 at an angle β. The first lower point 21" and second lower point 22" are on the same second first circumscribed curve. The circumscribed curves are illustrated in FIG. 10.

Figure 4:
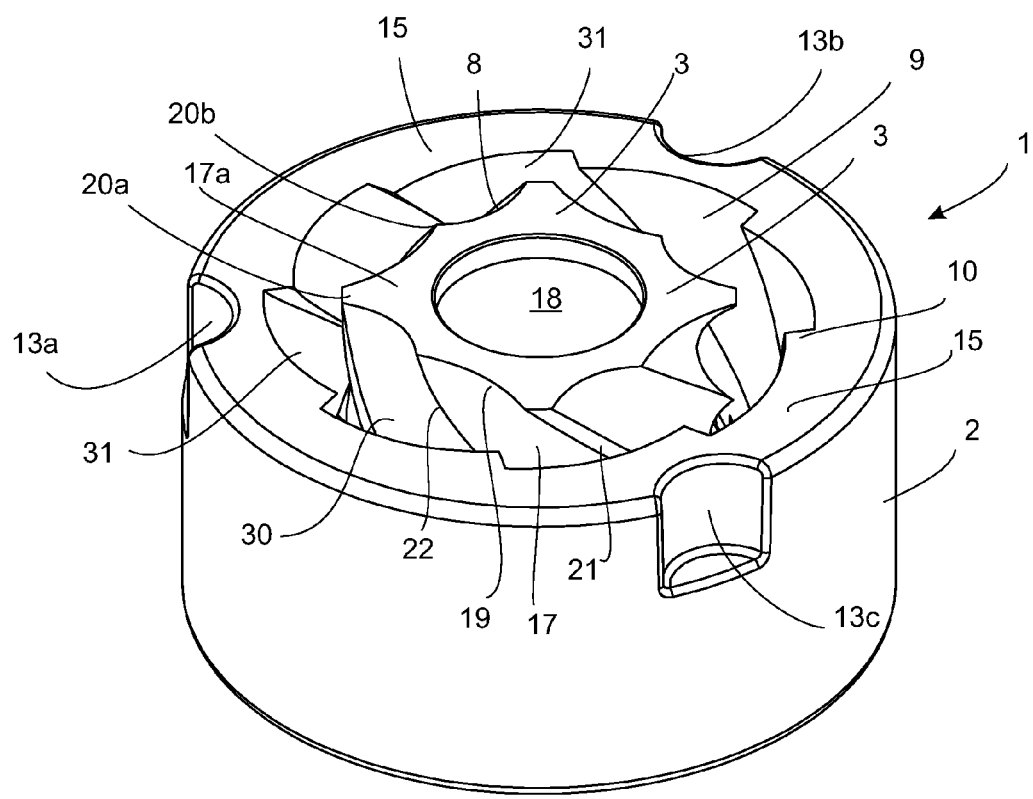
FIG. 4 shows the grinding unit seen in FIG. 1 in assembled state.
Figure 5:
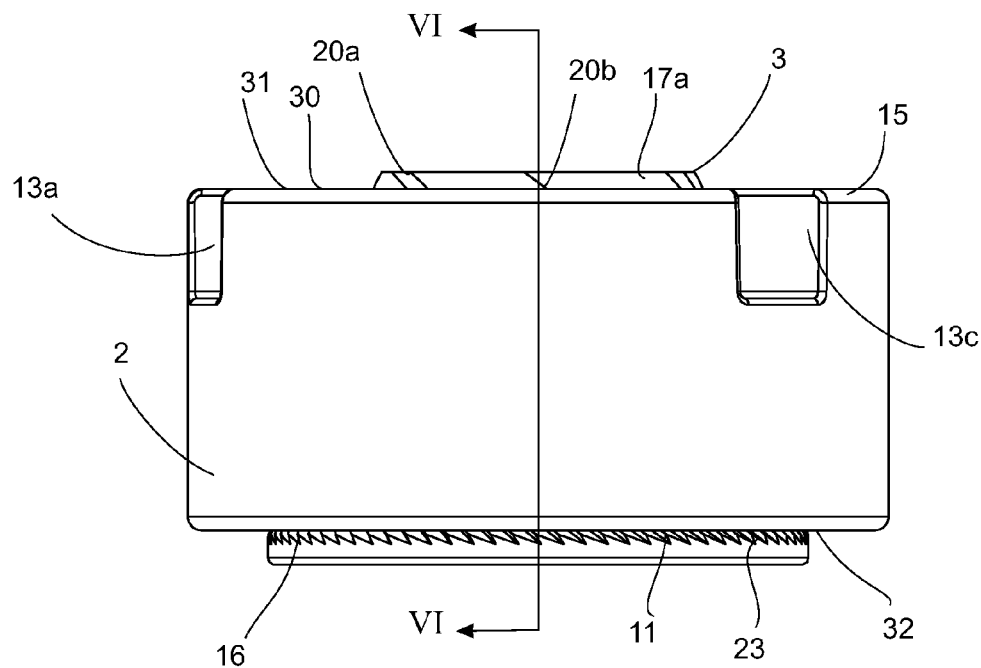
FIG. 5 shows the same seen from the side.

FIG. 4 shows the grinding unit 1 of FIG. 1 in assembled state and FIG. 5 shows the same seen from the side. The ring burr 2 surrounds the frustoconical burr 3 and defines a grinding gap 30 in-between. The grinding gap 30 is delimited by the interior wall 9 of the ring burr 2, the first curved teeth 10 of the ring burr 2, the annular exterior cone wall 19 of the frustoconical burr 3, and the second curved teeth 20a,20b to define a grinding gap inlet 31 and a grinding gap outlet 32.

Figure 6:
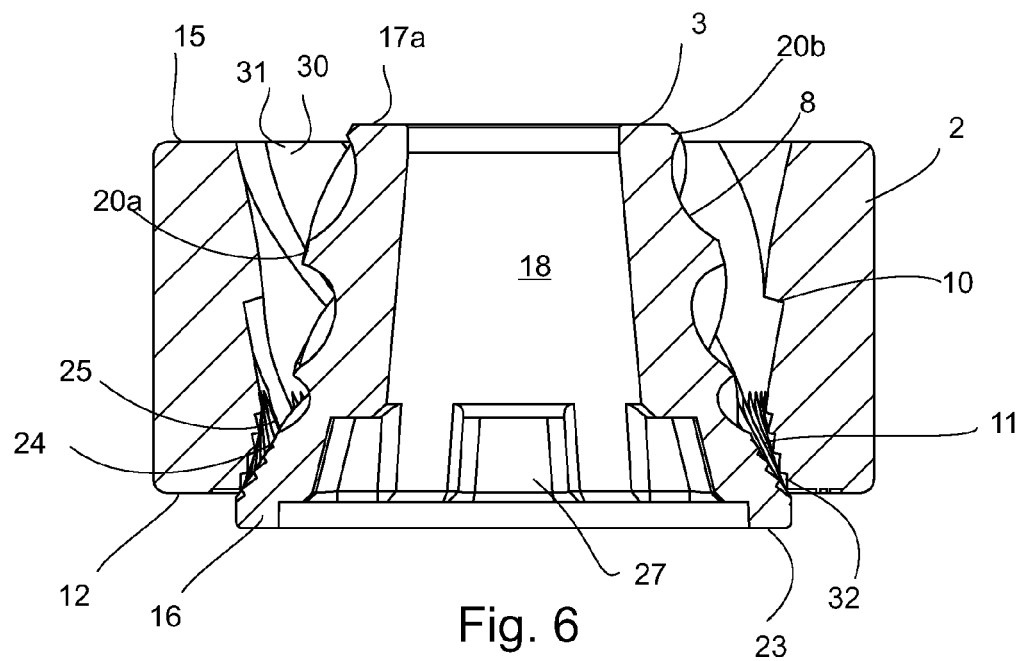
FIG. 6 is a longitudinal sectional view taken along line VI-VI in FIG. 5, FIGS. 7*a,b,c* are schematically sectional views illustrating the first and second angle of the grinding gap.

FIG. 6 is sectional view taken along line VI-VI of FIG. 5 to illustrate the grinding gap 30 extending downwards between the grinding gap inlet 31 and the grinding gap outlet 32. The second curved teeth 20a,20b delimiting grinding grooves 8 having tapering ends 25 are positioned opposite the first curved teeth 10 in the grinding gap 30. Because the first curved teeth 10 and the second curved teeth 20a,20b protrude towards each other the different configurations of the first subset 20a and the second subset 20b of teeth of second curved teeth provide the grinding gap 30 with different width and grinding groove sizes and shapes depending on the position of the frustoconical burr 3 when rotated in relation to the ring burr 2, with the result that coffee beans or other particles or granules are forcedly driven through the axial grinding length of the grinding gap 30 towards the grinding gap outlet 32 during grinding. The threading of the first curved teeth 10 of the ring burr 2 turns clockwise along the interior wall 9, and the threading of the second curved teeth 20a,20b of the frustoconical burr 3 turn counter-clockwise about the conical body, so when the frustoconical burr 3 is rotated, the opposite teeth 10;20a,20b can interact with optimum efficiency in the grinding process. The orientation of these threadings can quite as well be opposite.

FIG. 7 corresponds substantially to FIG. 6 and serves to schematically show the first angle φ and the second angle θ of the grinding gap 30. The frustoconical burr 3 is seen axially spaced from the ring burr 2 to better illustrate these angles. In the present case the height $h_b$ of the ring burr 2 is smaller that the height $h_{fb}$ of the frustoconical burr 3, however need not be so. The heights can be same or the ring burr be higher than the frustoconical burr.

Figures 7A, 7B, 7C:
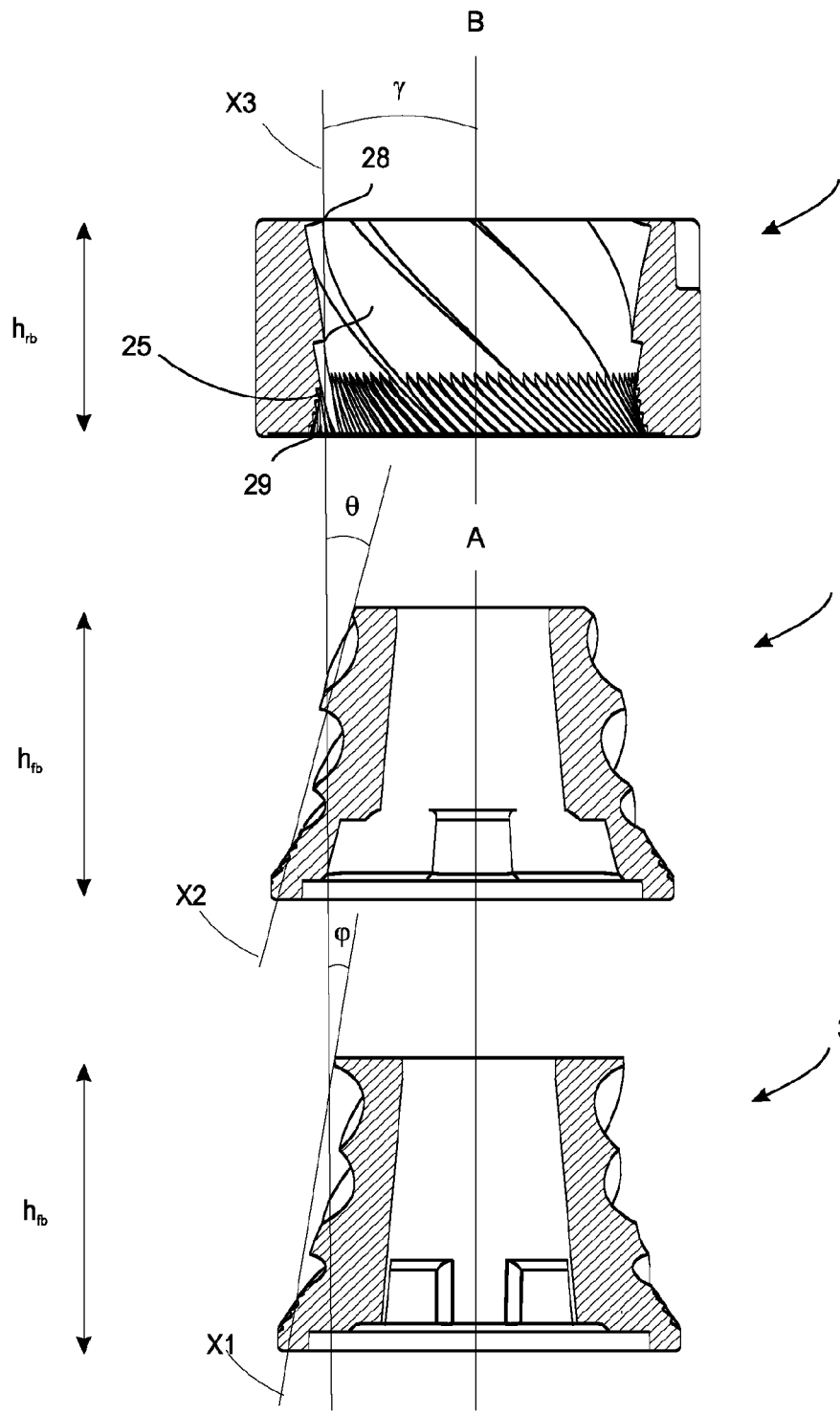

FIG. 7a illustrates the third line X3, which is at an angle γ with the longitudinal axis B through the centre of the ring burr 2. This angle γ is very steep and can in some embodiments even be zero. The third line X3 extends between a third upper point 28 on an upper inscribed curve of the first curved teeth 10 of the ring burr 2 at the grinding gap inlet 31 through a third lower point 29 on a lower inscribed curve of the first curved teeth 10 of the ring burr 2 at the entry 25 of the grinding gap outlet 32 and intersects the longitudinal centre axis B of the ring burr 2 at an angle γ. FIG. 7c shows the first angle φ between the first line X1 and the third line X3, and FIG. 7b shows the second angle θ between the second line X2 and the third line X3. The ring burr 2 and the frustoconical burr 3 are coaxially aligned. As is clear from the FIGS. 7a,7b,7b the second angle θ is greater than the first angle φ both being steeper than grinding gaps of known grinding units. Conventionally, there have been a prejudice to use grinding units with larger width of grinding gaps than specified in accordance with the present invention due to the apprehension that particles and granules could not enter the grinding gap appropriately to pass further down into the grinding gap and be properly grinded for a given purpose and a desired quality. As is clear from FIG. 7a,7b,7c the width of the grinding gap can be made wider by making a higher grinding unit while the grinding gap remains very steep. The grinding gap is advantageously in turn wide and narrow depending on the position of the opposite first curved teeth 19 and the second curved teeth 20a,20b when the frustoconical burr is rotated. The inscribed curves are seen better in FIG. 11.

Figure 8:
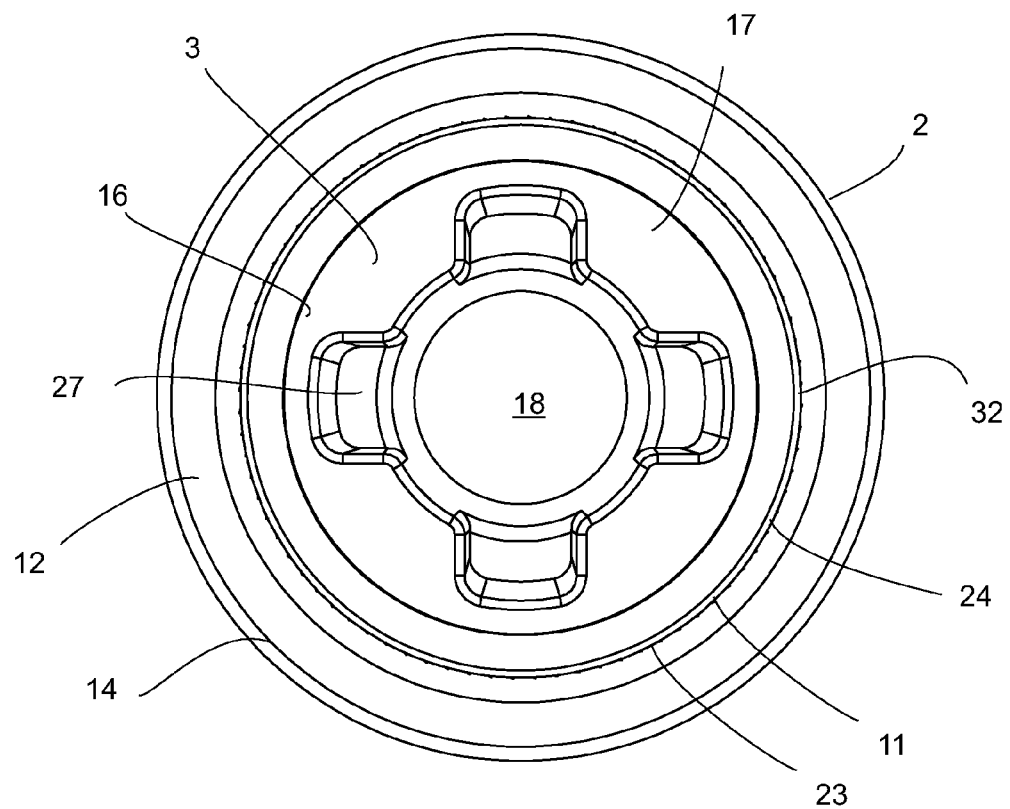
FIG. 8 shows the grinding unit seen in FIG. 4 seen from below.

FIG. 8 is a bottom view of the grinding unit 1 seen in FIG. 4 illustrating the opposite finer fourth teeth 11 of the ring burr 2 opposite the finer third teeth 24 of the frustoconical burr 3 at the grinding gap 30 outlet 32.

Figure 9:
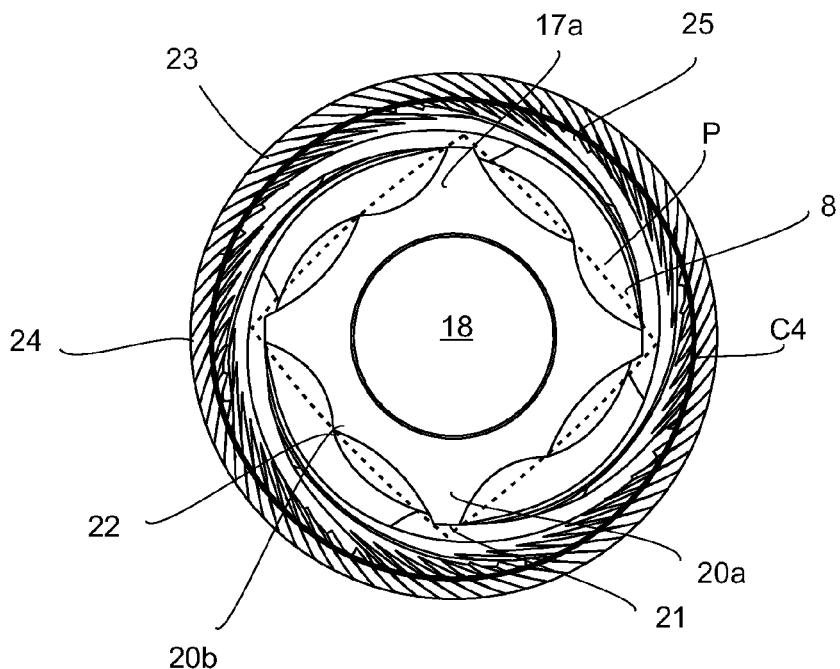
FIG. 9 shows the frustoconical burr from the top end face.

FIG. 9 shows the frustoconical burr 3 seen from the top end face 17a to illustrate that the cusps 21 of the first subset of teeth 20a and the cusps 22 of the second subset of teeth 20b defines a substantially squared outline P of an area S, as indicated by dashed substantially squared outline. The second first circumscribed curve C4 is illustrated at the tapered ends 25 of the grinding grooves 8.

In the top end view of the assembled first embodiment of a grinding unit 1 seen in FIG. 10 the first circumscribed circle C1 of the first subset of curved teeth 20a, the second circumscribed circle C2 of the second subset of curved teeth 20b, and the upper inscribed circle C3 of the first teeth 10 of the ring burr 2 are sketched in, to illustrate the radii R1, R2, and R3 of these at the grinding gap inlet 31, and thus the variable width of the grinding gap 30. In the respective sets of teeth 10;20a,20b R3>R1>R2. The collar 23 of finer third teeth 24 at the base 16 of the frustoconical burr 3 is seen at the grinding gap outlet 32. The cusps 21 of the teeth of the first subset of curved teeth 20a are blunt or flat contrary to the cusps 22 of the teeth of the second subset of curved teeth 20b, which are more pointed or less blunt.

Figure 11:
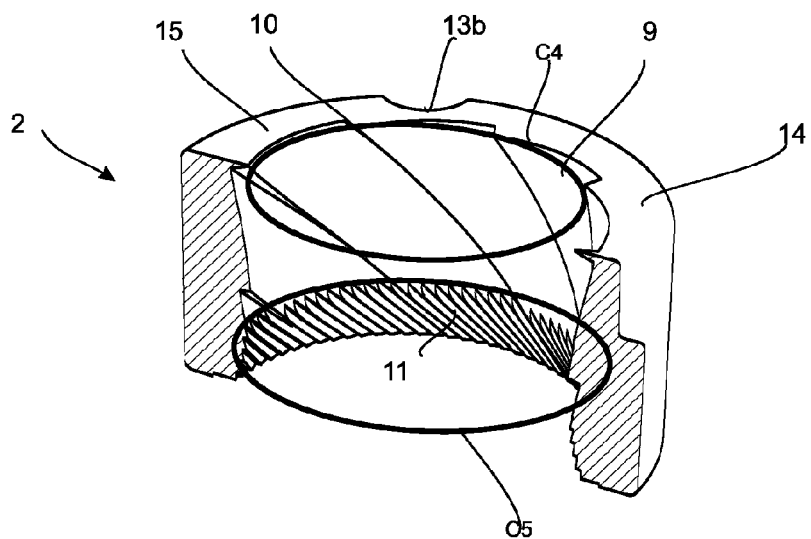
FIG. 11 is a longitudinal sectional view through the ring burr seen in FIG. 1 illustrating the lower inscribed curve.

FIG. 11 is a longitudinal sectional view seen inside the ring burr 2 illustrating the lower inscribed curve C5 and the upper inscribed curve C4.

Figures 13, 14:
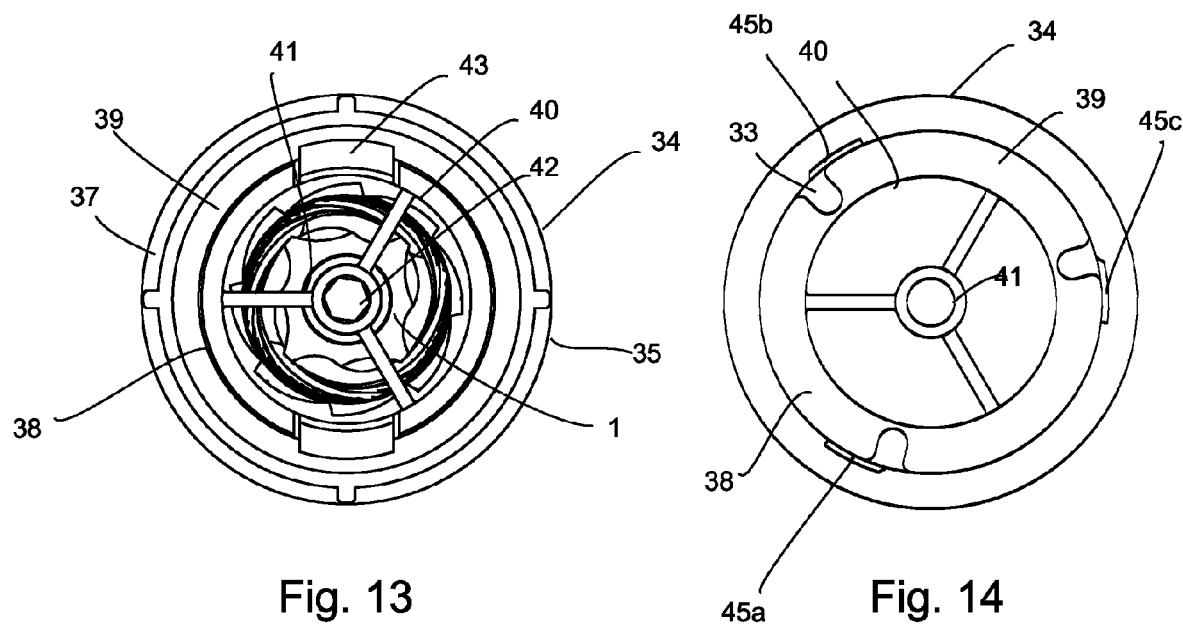
FIG. 13 shows the same seen from above and provided with a grinding unit.
FIG. 14 shows, seen from below, the cartridge housing without grinding unit.
Figure 12:
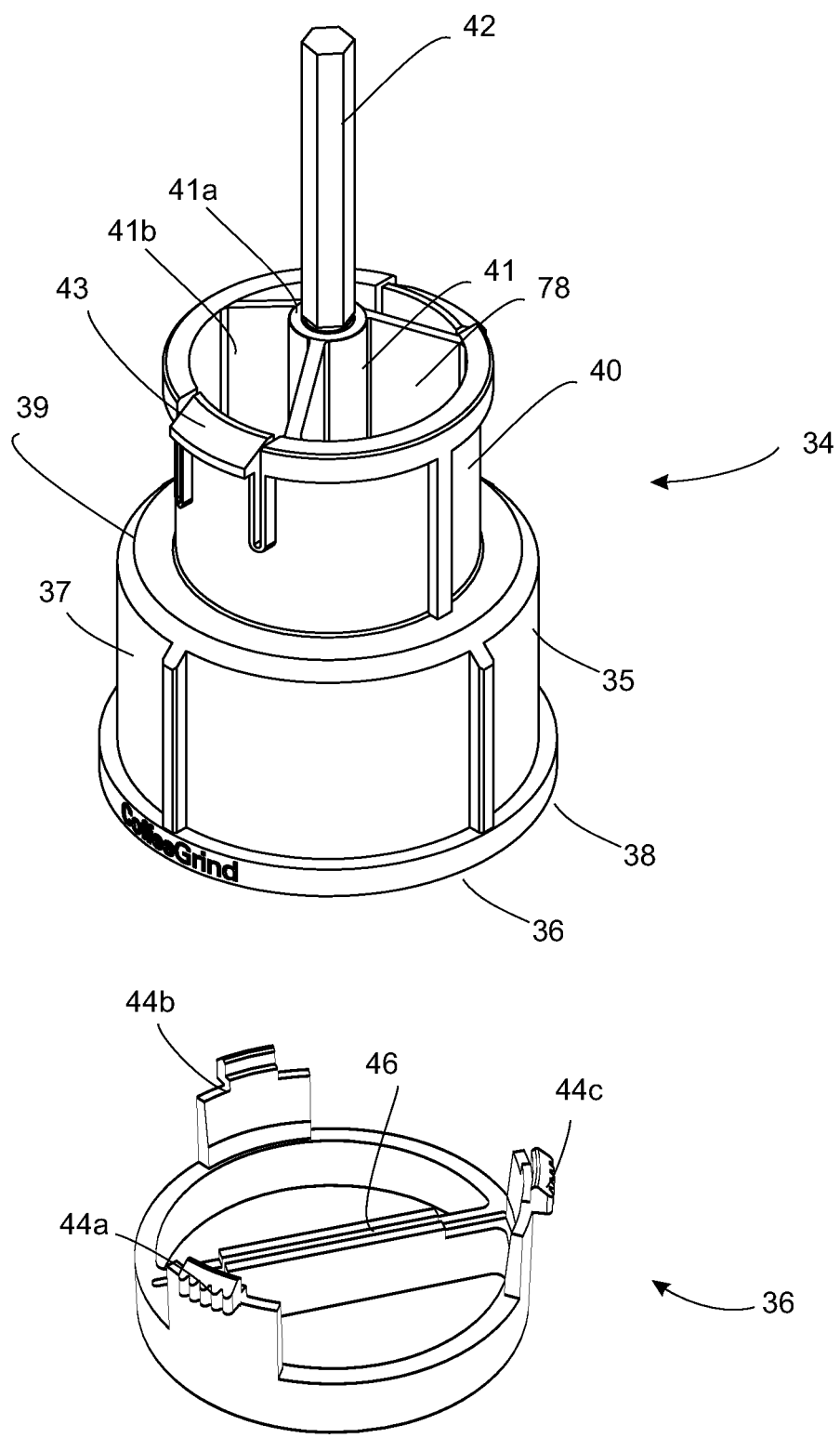
FIG. 12 is a perspective, exploded view of an exemplary first embodiment of a cartridge according to the invention.

A cartridge 34 for receiving the first embodiment of a grinding unit 1 is seen in perspective in FIG. 12, in a top view in FIG. 13 where the grinding unit 1 is inserted, and in a bottom view in FIG. 14, where the grinding unit 1 has not been inserted.

The cartridge 34 has a cartridge housing 35 and a detachable rotatable locking ring 36 suited to be accommodated in said cartridge housing 35 for keeping the grinding unit 1 in operative grinding position inside said cartridge housing 35. The cartridge housing 35 has a bottom housing 37 with a bottom opening 38 for inserting the first embodiment of a grinding unit 1, the bottom housing 37 has a circumferential shoulder 39 via which the bottom housing 37 extends into an upper part 40 configured for supplying matter to be grinded to the grinding unit 1. The shoulder 39 of the bottom housing 37 has at least one first internal locking protrusion 33, as seen best in FIG. 14, for engaging at least one complementary notch or groove 13a,13b,13c of the ring burr 2 to prevent rotation of the ring burr 2 during grinding. A logo, such as CoffeeGrind may be provided on any part of the cartridge housing, in the present case on the bottom housing 37. The upper part 40 includes an anchor means 41 for a grinding shaft 42 to be rotationally mounted in relation to a grinder house (not shown) and operatively connected/connectable to the frustoconical burr 3 to rotate said frustoconical burr 3 in relation to the ring burr 2, and coupling means 43 for mounting the cartridge 34 inside a grinder house (not shown) with the grinding shaft 42 accessible for performing the grinding operation. The anchor means 41 comprises a tube part 41a and a stay part 41b. The stay part 41b comprising spaced apart stays 78 connecting the interior wall of the upper part 40 to the tube part 41a that receives the grinding shaft 42.

The locking ring 36 has three axially protruding locking webs 44a,44b,44c fitting slidably into corresponding internal guide grooves 45a,45b,45c of the bottom housing 37. An internal guide groove 45a,45b,45c has an axial guide groove part (not shown) extending from the free opening 38 of the bottom housing 37 a distance towards the shoulder 39 and into a radially extending sloping guide groove part (not shown). The axial guide groove part and the sloping guide groove part substantially form an L shape. The locking ring 36 has a bridge member 46 than spans it's diameter and serves to avoid the grinding unit 1 dropping out of the cartridge housing 37 as well as a means for moving the frustoconical burr 3 along the longitudinal axis A;B of the grinding unit 1 when adjusting the grinding gap outlet 32 by rotating the locking ring 36. The bridge member 46 of the locking ring interlock with a bottom surface of the plug 5 inserted in the frustoconical burr 3 to rotate said frustoconical burr in relation to the ring burr.

Figure 15:
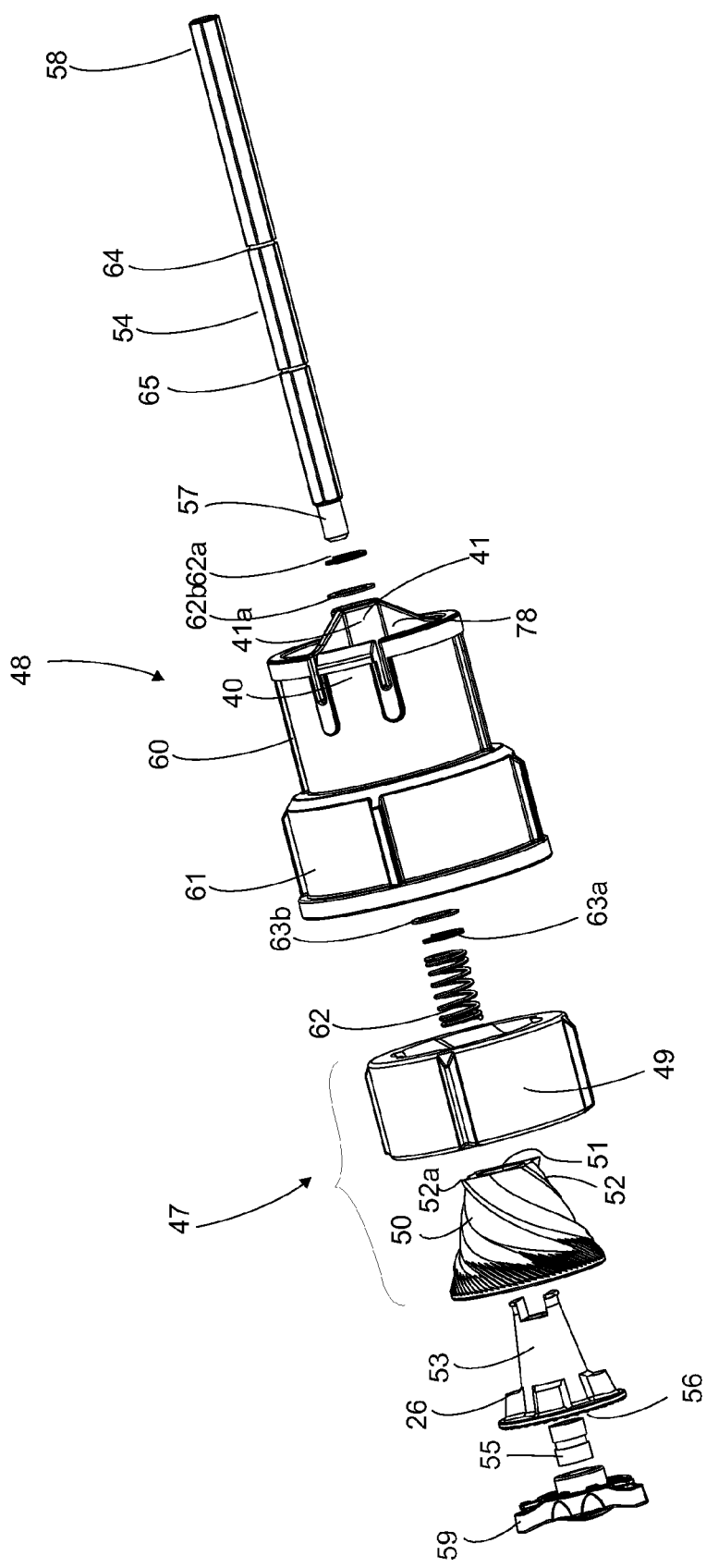
FIG. 15 is a perspective exploded view of the components of another embodiment of a second embodiment of a grinding unit in relation to a second embodiment of a cartridge.

FIG. 15 shows an exploded view of a second embodiment 47 of a grinding unit 47 in conjunction with a cartridge 48 according to the present invention. Components of the second embodiment are indicated by the prefix "second" to distinguish some feature from features of the first embodiment described above in relation to FIGS. 1-14 to avoid unnecessary repetition of words. Common features are indicated by same reference numeral, and feature of the first embodiment may be incorporated in the second embodiment, and vice versa.

The second grinding unit 47 comprises a second ring burr 49 and a corresponding second frustoconical burr 50 that fits into the bore of the second ring burr 48, thus having aligned axes. The overall design of the second embodiment of a ring burr 49 and the second embodiment of a frustoconical burr 50 corresponds substantially to the first embodiment of a ring burr 2 and the first embodiment of a frustoconical burr 3 discussed in relation to the preceding figures and like parts will not be discussed in details for the second embodiment of burrs 49,50 for the second grinding unit 47. The bore 51 of the second frustoconical burr 49 differs from the bore of the first embodiment of a frustoconical burr 3 in tapering more towards the top end face 52a of the top part 52, which top end face 52a has a substantial square geometrical outline P of an area S smaller than the substantial square area S of the top end face 17a of the top part 17 of the first embodiment of a frustoconical burr 3, as indicated in FIG. 9. The frustocone of the second embodiment of a frustoconical burr 50 is slightly less steep than the frustocone of the first embodiment of a frustoconical burr 3, the angles being $\phi \sim 17°$ and $\theta \sim 20°$.

A second embodiment of a plug 53, the second plug, fits into the bore 51 of the second embodiment of a frustoconical burr 49, thus the second frustoconical burr 49, to provide for anchoring of a second grinding shaft 54. The second plug 53 will be described in more detail with reference to FIGS. 23 and 24.

An optional nut 55 can be inserted into the second plug bore 56 of the second plug 53 to provide for firm engagement with a grinding gap adjusting wheel 59, that are coupled to a coupling end 57 of the second grinding shaft 54, e.g. a threaded coupling end 57, which second grinding shaft 54 has an opposite free end 58 for engaging an exterior operating means (not shown) of a grinder house. The second grinding shaft 54 extends through the second embodiment of a cartridge housing 60, the second frustoconical burr 50, which substantially concentrically is inserted in the second ring burr 49, the second plug 53, the nut 55 and is secured to the grinding gap adjusting wheel 59 at the coupling end 57.

Also the second embodiment of a cartridge 48 has plural features in common with the first embodiment of a cartridge 34, discussed in relation to the preceding figures and like parts will not be discussed in further details for the second embodiment of a cartridge 48.

The second cartridge 48 comprises a second cartridge housing 60 having an upper part 40 similar to the upper part 40 described for the first embodiment of a cartridge housing 35 and a second bottom housing 61 opposite the upper part 40. The second bottom housing 61 is made shorter than the first bottom housing 37 because of a.o. a different grinding gap adjusting system and a different interior design for retaining the second ring burr 49, as will be more clear from the subsequent figures.

The means for securing the second frustoconical burr 50 to the second grinding shaft 54 in operational arrangement in relation to the second ring burr 49 includes a spring 62, a first set of first clip 62a and first washer 62b, and a second set of second clip 63a and second washer 63b for keeping the spring 62 tensioned towards the second burrs 49,50, as will be more clear from the description of the subsequent figures. The anchor mans 41 controls the axial position of the second grinding shaft 54. The second grinding shaft 54 has a first annular groove 64 for receiving the first clip 62a and a second groove 65 for receiving the second clip 63a.

Figure 16:
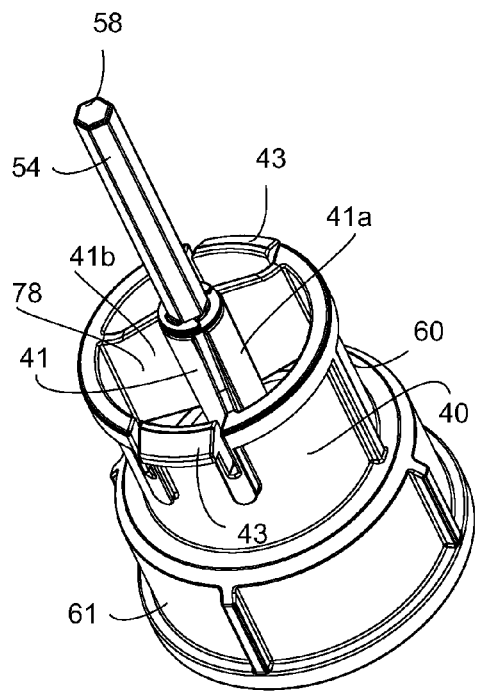
FIG. 16 shows the same in assembled state oblique from the upper part of the cartridge housing, and wherein the grinding unit is mounted in the cartridge to the grinding shaft of the cartridge.
Figure 17:
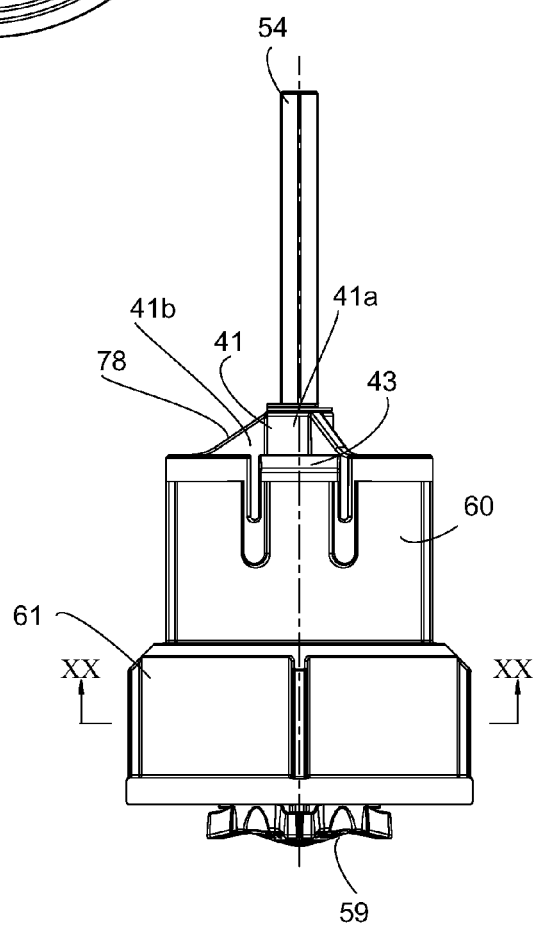
FIG. 17 shows the same seen from the side.

FIG. 16 illustrates the components seen in FIG. 15 in assembled state oblique from the free end 58 of the grinding shaft 54. The second burrs 49,50 are inserted inside the second cartridge housing 60 and the grinding shaft 54 extends inside the anchor means 41 through the second burrs 49,50 and is secured in the grinding gap adjusting wheel 59, as seen better in the side view of FIG. 17.

Figure 18:
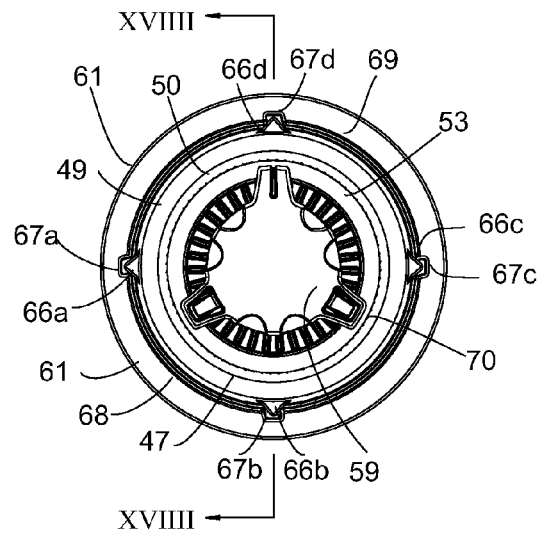
FIG. 18 shows the same seen from the bottom.
Figure 23:
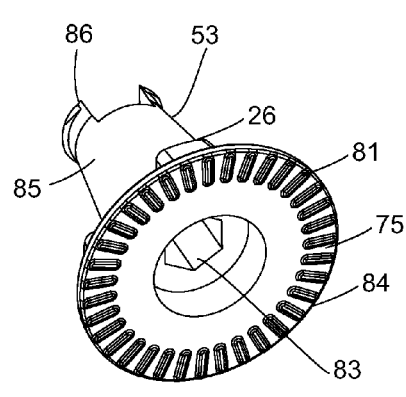
FIG. 23 shows seen in perspective oblique form the bottom a second embodiment of a plug for engaging the grinding shaft.
Figure 24:
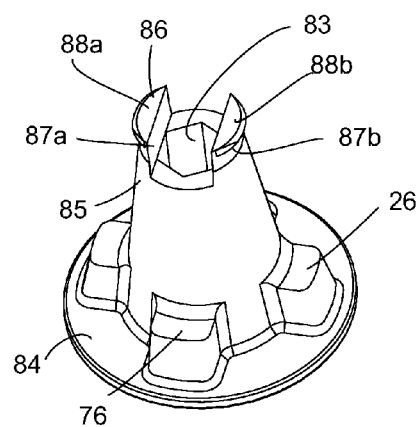
FIG. 24 shows the same from the top.

FIG. 18 is a bottom view of the assembled second cartridge 48 with the second grinding unit 47 mounted inside the second bottom housing 61. The second ring burr 49 has protruding female keys 66a,66b,66c,66d for engaging slots 67a,67b,67c,67d provided in the interior wall 68 of the second bottom housing 61. The slots 67a,67b,67c,67d extend from the free inner end face of free edge 69 of the bottom housing 61 a distance towards the upper part 40, which distance is sufficient to accommodate the height of the second ring burr 49 inside the bottom housing 61 in an engagement that prevents rotation as well as axial displacement of the second ring burr 49. In the present case the distance of the slots 67 is from the end face of free edge 69 to the interior breast 39' created by the shoulder 39, as seen in FIGS. 23 and 24. For the second embodiment of the assembled second cartridge 48 fitted with the second grinding unit 47 the second frustoconical burr 50 is displaced axially by rotating the grinding gap adjusting wheel 59 to adjust the size of the second grinding gap outlet 70.

Figure 25:
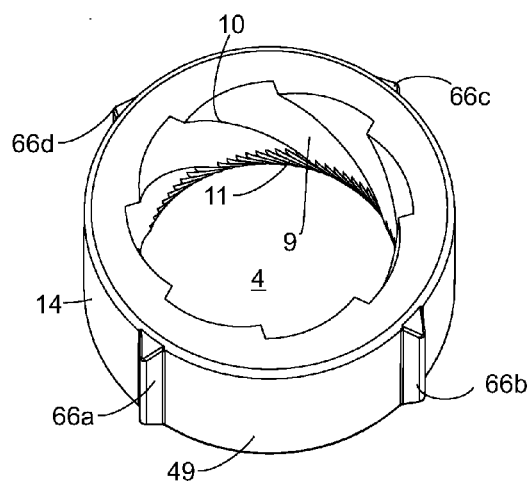
FIG. 25 shows the second ring burr form the top.
Figure 26:
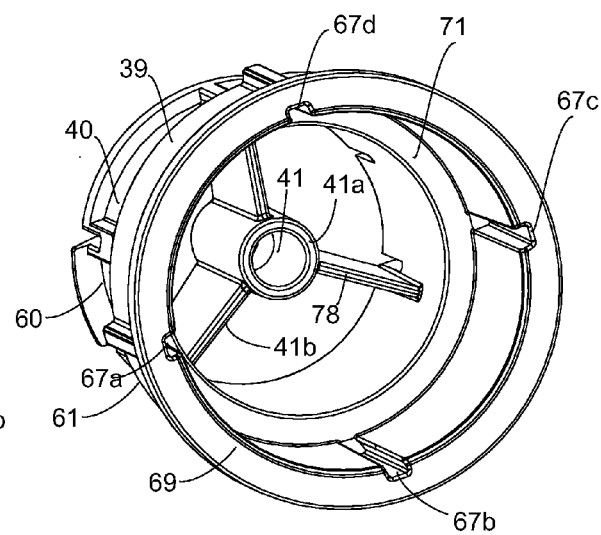
FIG. 26 shows the second cartridge housing from the bottom.

The radial and axial extension of the female keys 66a, 66b,66c,66d on the wall of the second ring burr 49 is seen better in the view of FIG. 25 of the second ring burr 49, and the radial and axial extension the male slots 67a,67b,67c, 67d are seen better in the bottom view of the cartridge housing 60 seen in FIG. 26.

Figure 19:
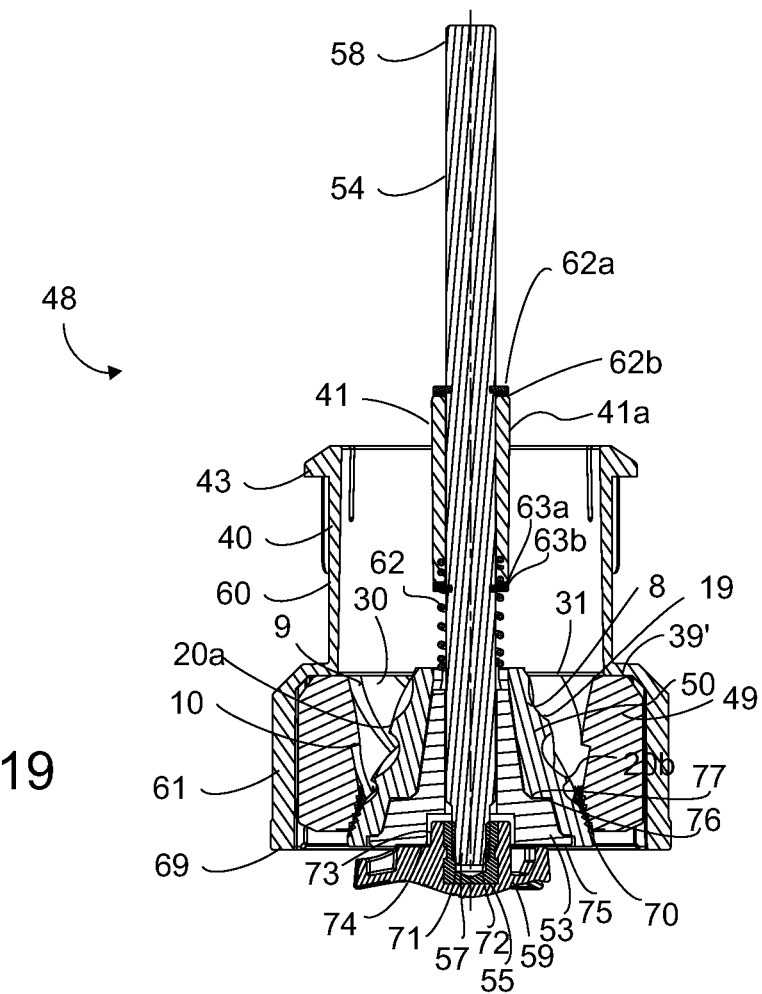
FIG. 19 is a sectional view taken along line XVIIII-XVIIII in FIG. 18.

FIG. 19 is a sectional view of the second assembled cartridge 48 fitted with the second grinding unit 47 ready for grinding, milling and crushing raw matter, such as coffee beans. Raw matter is introduced to the tapering grinding gap 30 via the grinding gap inlet 31 and exits via the second grinding gap outlet 70 as finer matter after having been processed by subjected to the abrasive action when catched between the second ring burr 50's first curved teeth 10, which protrude into the grinding gap 30, and the frustoconical burr 49's second curved teeth 20*a*;20*b* facing towards the first curved teeth 10 to cooperate in grinding.

The coupling end 57 of the second grinding shaft 54 has an external thread 71 to be screwed into an internal thread 72 of the nut 55, which nut 55 is firmly attached to a tubular connection piece 73 of the grinding gap adjustment wheel 59, which tubular extension piece 73 protrudes from a contact face 74 of said grinding gap wheel 59. The contact face 74 abuts a knurled base face 75 of the second plug 53, as seen in FIG. 23.

When the grinding gap wheel 59 is rotated it's screw action adjusts the axial position of the grinding gap adjustment wheel 59 on the external thread 71 of the coupling end 57 of the second grinding shaft 54 to open and close the second grinding gap outlet 70. The axial displacement of the second plug 59 and the second frustoconical burr 50 thus takes place as a combined unit due to respective abutting annular plug shoulder 76 and annular cone breast 77. Clockwise rotation of the grinding gap adjustment wheel 59 may e.g. reduce the second grinding gap outlet 70 by moving the united second plug 53 and second frustoconical burr 50 closer to the second ring burr 49, thus upwards, whereas an anticlock-wise rotation will increase the second grinding gap outlet 70 by moving the united second plug 53 and the second frustoconical burr 50 away from the second ring burr 49. The opposite arrangement is likewise possible.

Figure 20:
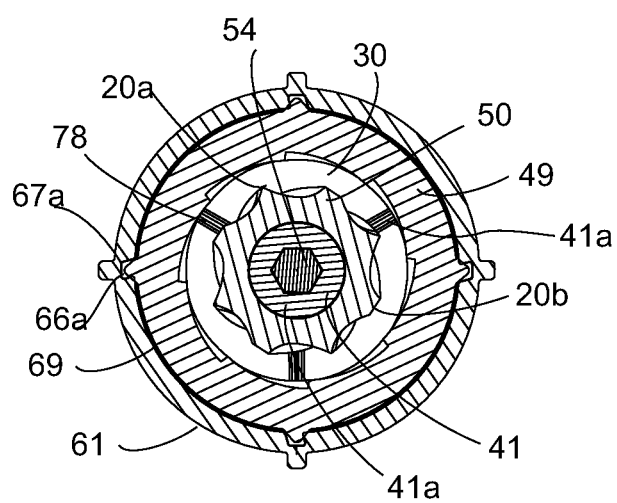
FIG. 20 is a sectional view taken housing along line XX-XX in FIG. 17, and viewed from the bottom of the cartridge.

The cross-sectional view of FIG. 20 is taken about midway of the bottom housing 61 of the second cartridge housing 60 fitted with the second grinding unit 47. The base 16 of the second frustoconical burr 50 is substantially circular, and the substantially square geometrical outline P taken through the cusps 21;22 of the second curved teeth 20*a*,20*b* at the top end face 52*a* of the top part 52 of the second frustoconical burr 50 opposite the base 16 gradually becomes more circular outline the closer the base 16 to create a uniform second grinding gap outlet 70, and to avoid that large processed particle to slip through the second grinding gap outlet 70.

Both the first embodiment of a cartridge housing 35 and the second embodiment of a cartridge housing 60 has an anchor means 41 comprising a tube part 41*a* for receiving a grinding shaft 42;54 and a stay part 41*b* comprising three stays 78 that connects the tube part 41*a* to the upper part 40 of the cartridge housing 35;60.

Figure 21:
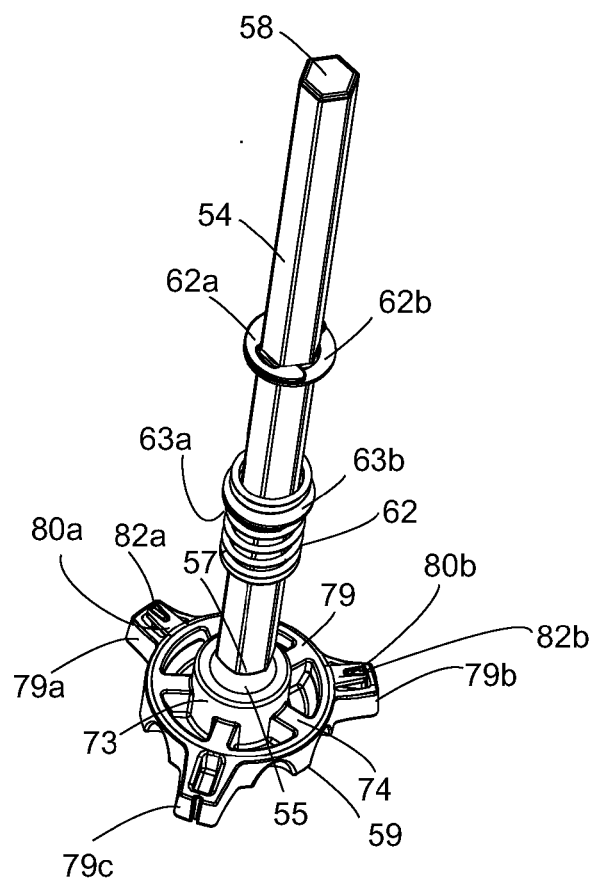
FIG. 21 shows seen in perspective oblique from above an embodiment of a grinding gap adjustment means in form of a rotating wheel mounted to the grinding shaft.
Figure 22:
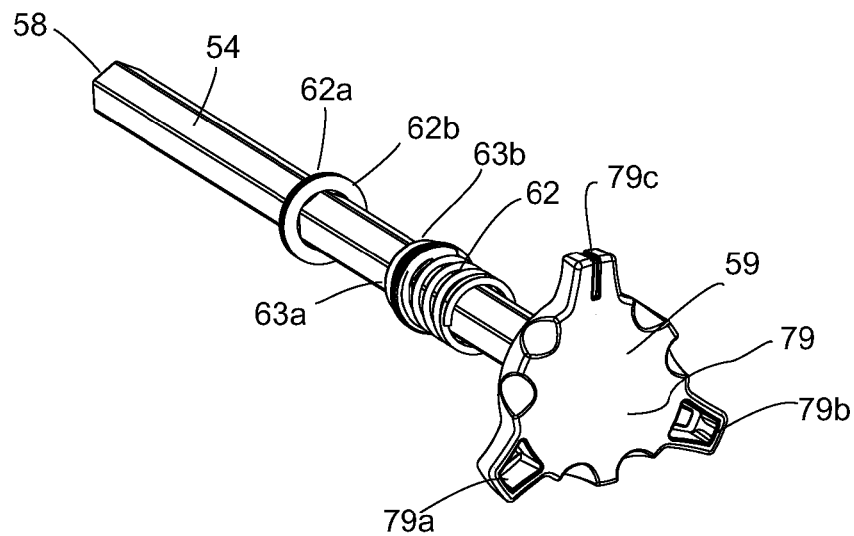
FIG. 22 shows the same from below.

FIGS. 21 and 22 are different perspective views illustrating the grinding gap adjustment wheel 59 being rotationally mounted on the coupling end 57 of the second grinding shaft 54.

The grinding gap adjustment wheel 59 has a wheel base 79 with three finger grip arms 79*a*,79*b*,79*c* protruding from the connection piece 73. The finger grip arms 79*a*,79*b*,79*c* are easily taken by the fingers of a user for rotating the grinding gap adjustment wheel 59 with the purpose of adjusting the second grinding gap outlet 70 and thus the particle size of grinded matter. The tube part 41*a* of the anchor means 41 (see FIG. 19) is located between the first set of first washer 62*b* and first clip 62*a* and the second set of second washer 63*b* and second clip 63*a* so that the spring 62 applies a spring force on the second top end face 52*a* of the second frustoconical burr 50 against which spring force the grinding gap adjustment wheel 59 is rotated for adjusting the second grinding gap outlet 70.

In the present embodiment two finger grip arms 79*a*,79*b* of the three 79*a*,79*b*,79*c* finger grip arms have a small plate spring 80*a*,80*b* for hitting annular ridges 81 of the knurled base face of the second plug 53, as seen in FIG. 23. A total of thirty-five ridges 81 are provided in the present second embodiment of a plug 53. Each plate spring 80*a*,80*b* has an upright nose 82*a*,82*b*. When the grinding gap adjustment wheel 59 is rotated the upright noses 82*a*,82*b* must pass the annularly spaced apart ridges 81 provided along the perimeter of the knurled base face 75 of the second plug 53. The upright noses 82*a*,82*b* of the flexible plate springs 80*a*,80*b* hit on the superjacent ridges 81 and create an audible click-noise indicating to the operator that the second grinding gap outlet 70 has been adjusted to an extent associated with the number of click-noises. So the number of clicks indicates how much the second grinding gap outlet 70 has been adjusted and helps the operator in making a decision to that aspect and ensure that proper adjustment is done.

The second embodiment of a plug 53 seen in FIGS. 23 and 24 is basically similar to the first embodiment of a plug 5. The second embodiment of a plug 53 also has engagement means 26 for coupling with complementary engagement means 27 of the frustoconical burr 3 in order to establish an antirotation means for the second grinding shaft 54 in relation to the second frustoconical burr 50, thus to ensure that rotation of the second grinding shaft 54 causes the required rotation of the second frustoconical burr 50 inside the second ring burr 49 for performing grinding. The upper face of the engagement means 26 is the annular plug shoulder 76 in contact with the annular cone breast 77 of the second frustoconical cone 50.

For grinding the free end 58 of the second grinding shaft is rotated to rotate the second frustoconical burr 50 independent on the grinding gap adjustment wheel 59. Similar applies for the first embodiment where the locking ring needs to rotated to adjust the grinding gap outlet 32. The second through-going bore 83 of the second plug 53 has a hexagonal cross-section mating the hexagonal cross-section of the second grinding shaft 54, similarly to the features of the first embodiments.

The second plug 53 has a second foot 84 that fits into the base 16 of the second frustoconical burr 54 and a second neck 85 that fits into the bore 18 of the second frustoconical burr 50. The second neck 85 terminates in a head 86. The head 86 has two opposite upright webs 87*a*,87*b* fitting into the opening of the bore 18 at the top end face 52*a* of the second frustoconical burr 50. The upright webs 87*a*,87*b* are able to flex to and fro each other so that outwards collar webs 88*a*,88*b* at the free ends of the upright webs 87*a*,87*b* can pass over the top end face 52*a* of the second frustoconical burr 50 to lock the second plug 53 firmly in proper position inside the second frustoconical burr 50. The upright webs 87*a*,87*b* with respective outwards collar webs 88*a*,88*b* are a further means to prevent unintentional axial displacement of the second plug 53 in relation to the second frustoconical burr 50, thus to make the second frustoconical burr 50 and the second plug 53 one integral unit.

It should be noted that the cartridges 34;48 can also be used with conventional grinding units.

The superiority of the grinding units according to the present invention is illustrated in the below Examples.

Examples

The grinding unit of the present invention has been manufactured and tested against two conventionally obtainable grinding units on the market:

The Japanese grinding units used in Kyocera Conical Ceramic Burr Hand Turn Coffee, and a Chinese version being substantially a copy of these Japanese grinding units. The Chinese copy is substantial of same design as the Japanese, but differs in a very abrupt transition between first curved teeth and fourth curved teeth of the ring burr. Both had six second curved teeth, with three teeth in each of the first subset and the second subset of second curved teeth. The radius of the teeth of the first subset was larger than the radius of the teeth of the second subset and the teeth of a first subset were arranged on a frustoconical body alternating with teeth of the second subset and the outline of the area of the top face of the tope end of the frustoconical body is substantially a triangle.

The aim of the test was to investigate how (time) efficient the grinding units were at grinding espresso coffee beans.

A frustoconical burr of the present invention was given the dimensions:
$h_{fb}$=29 mm
Rb=20 mm
R1=14.5 mm
R2=12 mm
Where $h_{fb}$ is the height of the frustoconical burr, Rb is the radius of the base of frustoconical burr, R1 is the radius of the first circumscribed curve defined by the teeth of the first subset at a free top end face of the frustoconical burr, and R2 is the radius of the second first circumscribed curve of the teeth of the second subset at the top end face of the frustoconical burr.

A corresponding ring burr of the present invention was given the dimensions:
$h_{rb}$=25 mm
R3=19 mm
R4=18 mm
Where $h_{rb}$ is the height of the ring burr, R3 is the radius of the inscribed curve of the first curved teeth of the ring burr at the grinding gap inlet, and R4 is the radius of the lower inscribed curve of the first curved teeth of the ring burr at the entry of the grinding gap outlet.

The frustoconical burr was positioned in the opening of the ring burr in such as way that their longitudinal axes coincided, though displaced along their longitudinal axes relative to each other such that approximately
R3−R2=6.4 mm
R3−R1=3.6 mm
which resulted in a first angle of 9° and a second angle of 16°. The size of the grinded coffee beans were comparable to what is used for (finely sized) espresso.

For the Chinese and Japanese grinding units the similarly identified dimensions were approximately, $h_{fb}$=19 mm, $h_{rb}$=15 mm, Rb=15.5 mm, R1=10 mm, R2=8 mm, R3=14 mm, and R4=14 mm. Furthermore, the first and second angles are approximately 20° and 27°.

The test was carried out by pouring coffee beans into the grinding unit, rotating the frustoconical burr 50 times around it's longitudinal axis, and weighing the amount of grinded coffee beans. The results were:
Grinding unit according to the invention=24 g
Chinese grinding unit=3.3 g
Japanese grinding unit=4.5 g The grinding unit of the present invention thus produced 7.3 times as much grinded coffee beans as the Chinese grinding unit, and 5.3 times as much grinded coffee beans as the Japanese grinding unit, even though $h_{fb}$ and $h_{rb}$ were only 1.5 and 1.7 times higher, respectively, and the gaps R3−R2 and R3−R1 were about 6 and 4 mm, respectively, i.e. approximately similar. The grinding unit of the present invention thus grinded much more coffee beans, and thus was much more time efficient than the Chinese and the Japanese grinding units.

Another embodiment of the frustoconical burr used with substantially same ring burr had the same height and same base diameter but different area of substantially square outline P:
R3−R2=9.25 mm
R3−R1=6.75 mm
which resulted in a first angle of 17° and a second angle of 20° and similar excellent grinding properties.

Although the invention is described above in context with food products and for a manually operated grinding unit it should be understood that other kinds of particles than food product particles can be grinded, as well as a motor can be incorporated to operate the device.

The cartridge can be dimensioned to fit conventional grinders and any particulate or granular matter be grinded by means of the grinding unit according to the present invention. Particles or granules can e.g. be between 2-15 mm and the height and weight sized and number of teeth adjusted so that the grinding gap inlet allows entry of such sizes and shapes of particles.

What is claimed is:

1. A grinding unit comprising at least:
a stationary ring burr with an opening for receiving a rotary frustoconical burr to delimit a grinding gap therebetween, which grinding gap has an outlet for grinded matter at a base of the frustoconical burr and an inlet for matter to be grinded at the opposite top end face of the frustoconical burr,
the ring burr having an interior wall provided with annularly spaced apart first curved teeth protruding radially into the grinding gap, and
the frustoconical burr having an annular exterior wall provided with annularly spaced apart second curved teeth protruding into the grinding gap;
wherein the second curved teeth comprise a first subset of curved teeth and a second subset of curved teeth configured so that at least a part of the curved teeth of the first subset protrudes longer into the grinding gap than the second subset of curved teeth, so that the first subset of curved teeth and the second subset of curved teeth define axially extending grinding grooves tapering towards a base of the frustoconical burr, with each of the second curved teeth having a cusp; and
wherein the second curved teeth fit within a geometrical outline of a square or rectangle formed of straight lines wherein the lines contact the cusps of the second curved teeth at the top end face of the frustoconical burr opposite the base; and
wherein the teeth of the first subset have a different configuration than the teeth of the second subset, and a tooth of the first subset is followed by a tooth of the second subset so that the teeth of the first subset alternate with the teeth of the second subset around the frustoconical burr, with each tooth comprising a radially protruding rib twisting about the frustum of the frustoconical burr; and
wherein the radial distance from the cusps of the first subset of teeth to the ring burr and the radial distance from the cusps of the second subset of teeth to the ring burr are different.

2. The grinding unit according to claim 1, wherein the cusps of the first subset of curved teeth are located at the corners of the square or rectangle.

3. The grinding unit according to claim 1, wherein the distance between the cusps of two opposite teeth of the first subset of curved teeth is larger than the distance between the cusps of two opposite teeth of the second subset of curved teeth.

4. The grinding unit according to claim 1, wherein the number of teeth of the second curved teeth is an even number.

5. The grinding unit according to claim 1, wherein the cusps of the first subset of teeth are blunt and the cusps of the second subset of teeth are pointed.

6. The grinding unit according to claim 1, wherein a first line extends via a first upper point on a first circumscribed curve of the teeth of the first subset of curved teeth at a free top end face of the frustoconical burr through a first lower point on a second first circumscribed curve at tapered ends of the grinding grooves, and contacts a longitudinal axis of the frustoconical burr, a second line extends via a second upper point on a second circumscribed curve of the teeth of the second subset of curved teeth at the free top end face of the frustoconical burr through a second lower point on the second first circumscribed curve at tapered ends of the grinding grooves, and contacts a longitudinal axis of the frustoconical burr, a third line extends between a third point on an upper inscribed curve of the first curved teeth of the ring burr at the grinding gap inlet through a third lower point on a lower inscribed curve of the first curved teeth of the ring burr at the entry of the grinding gap outlet, and intersects the longitudinal axis of the ring burr, wherein a first angle $\phi$ between the first line and the third line is smaller than or equal to a second angle $\theta$ between the second line and the third line.

7. The grinding unit according to claim 6, wherein the first angle $\phi$ between the first line and the third line is smaller than or equal to 20°, and the second angle $\theta$ between the second line and the third line is smaller than or equal to 25°.

8. The grinding unit according to claim 6, wherein the first angle $\phi$ is smaller than or equal to 19°, smaller than or equal to 18°, smaller than or equal to 17°, smaller than or equal to 16°, smaller than or equal to 15°, smaller than or equal to 14°, smaller than or equal to 13°, smaller than or equal to 12°, or smaller than or equal to 11° and the second angle $\theta$ is smaller than or equal to 25°, smaller than or equal to 24°, smaller than or equal to 23°, smaller than or equal to 22°, smaller than or equal to 21°, smaller than or equal to 20°, or smaller than or equal to 19°.

9. The grinding unit according to claim 1, wherein the ring burr and the frustoconical burr have heights and widths selected to provide a desired grinding gap inlet.

10. The grinding unit according to claim 1, wherein the height of the frustoconical burr is at least 65% of the diameter of the base of the frustoconical burr, at least 67%, or at least 69%.

11. The grinding unit according to claim 1, wherein the curved teeth of the first subset are arranged to alternate with the curved teeth of the second subset.

12. The grinding unit according to claim 1, wherein at least one of the ring burr or the frustoconical burr, or both are made of at least one ceramic material.

13. The grinding unit according to claim 1, wherein the ring burr or the frustoconical burr is axially displaceable along its longitudinal axis.

14. The grinding unit according to claim 1, wherein the first curved teeth have a curvature that is different from that of the second curved teeth, wherein one of the first or second curved teeth have a clockwise first threading, and the other has is a counter-clockwise second threading, or vice versa.

15. The grinding unit according to claim 1, wherein either the second curved teeth divide into a multiplicity of finer curved third teeth towards the base of the frustoconical burr or the first curved teeth divide into a multiplicity of finer curved fourth teeth towards the base of the ring burr.

16. A system comprising the grinding unit according to claim 1, in combination with a cartridge comprising a cartridge housing and grinding gap adjusting means, rotatable about its central axis; the cartridge housing comprising a bottom housing with a bottom opening for inserting the grinding unit; the bottom housing having a circumferential inner shoulder via which the bottom housing extends into an upper part configured for supplying matter to be grinded to the grinding unit and retainer means to prevent rotation of the ring burr during grinding, wherein the retainer means is provided by the shoulder of the bottom housing having at least one first locking protrusion for engaging at least one complementary groove of the ring burr.

17. The system according to claim 16, wherein the grinding gap adjusting means is selected from a rotatable locking ring or a rotatable grinding gap adjusting wheel.

18. The system according to claim 17, wherein the rotatable locking ring has at least two axially protruding locking webs fitting slidably into corresponding internal guide grooves of the bottom housing, wherein an internal guide groove has an axial guide groove part extending from a free opening of the bottom housing a distance towards a shoulder into a radially extending sloping guide groove part.

19. The system according to claim 16, wherein the upper part includes anchor means for a grinding shaft rotationally mounted in a grinder house and operatively connected to the frustoconical burr by extending through the cartridge housing and the grinding unit which is inserted in the cartridge housing via the bottom housing, and coupling means for mounting the cartridge inside the grinder house with the grinding shaft accessible for performing the grinding operation.

20. The system according to claim 16, wherein the cartridge further comprises at least a plug to be inserted into the bore of the frustoconical burr for also receiving and engaging the grinding shaft extending axially through the plug.

21. A system comprising the grinding unit according to claim 1, in combination with a cartridge comprising a cartridge housing and grinding gap adjusting means, rotatable about its central axis; the cartridge housing comprising a bottom housing with a bottom opening for inserting the grinding unit; the bottom housing having a circumferential inner shoulder via which the bottom housing extends into an upper part configured for supplying matter to be grinded to the grinding unit and retainer means to prevent rotation of the ring burr during grinding, wherein the retainer means is provided by the shoulder of the bottom housing having at least one first locking protrusion for engaging at least one complementary notch or groove of the ring burr, wherein the interior wall of the bottom housing has at least one complementary axially extending slot, notch or groove for engaging with at least one radially protruding female key of the ring burr.

* * * * *